United States Patent
Muraki

(10) Patent No.: US 7,809,409 B2
(45) Date of Patent: Oct. 5, 2010

(54) MULTI-FUNCTION DEVICE FOR PERFORMING AT LEAST TELEPHONE COMMUNICATION AND FACSIMILE FUNCTIONS

(75) Inventor: Motohito Muraki, Nagoya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 816 days.

(21) Appl. No.: 11/682,656

(22) Filed: Mar. 6, 2007

(65) Prior Publication Data

US 2007/0211303 A1    Sep. 13, 2007

(30) Foreign Application Priority Data

Mar. 7, 2006    (JP)    ............... 2006-061909

(51) Int. Cl.
*H04B 1/38* (2006.01)
*H04M 1/00* (2006.01)

(52) U.S. Cl. ............... 455/573; 455/66.1; 455/556.1; 455/557; 455/569

(58) Field of Classification Search ............... 455/66.1, 455/556.1, 557, 569.1, 575.1, 573
See application file for complete search history.

(56) References Cited

U.S. PATENT DOCUMENTS

| 7,308,095 | B2 | 12/2007 | Ishida et al. |
| 2005/0075132 | A1 | 4/2005 | Ukon |
| 2005/0248647 | A1* | 11/2005 | Tanaami et al. ............. 347/108 |
| 2006/0013386 | A1 | 1/2006 | Ishida et al. |

| 2007/0077965 | A1* | 4/2007 | Fox ........................ 455/557 |

FOREIGN PATENT DOCUMENTS

| CN | 1722763 A | 1/2006 |
| JP | H61-057642 U | 4/1986 |
| JP | H63-057642 U | 4/1986 |
| JP | H63-087055 A | 4/1988 |
| JP | H01-126735 U | 8/1989 |
| JP | H02-203648 A | 8/1990 |
| JP | H03-109453 U | 11/1991 |
| JP | H04-003640 A | 1/1992 |
| JP | H04-196851 A | 7/1992 |
| JP | H10-126839 A | 5/1998 |
| JP | 2005-079618 A | 3/2005 |

OTHER PUBLICATIONS

State Intellectual Property Office; Office Action in Chinese Patent Application No. 2007100877174 (counterpart to the above-captioned U.S. patent application) mailed Jun. 5, 2009 (partial translation).

* cited by examiner

*Primary Examiner*—Tuan A Pham
(74) *Attorney, Agent, or Firm*—Baker Botts L.L.P.

(57) ABSTRACT

A multi-function device for performing, at least, telephone communication and facsimile functions, comprising: a main unit, a wireless telephone, and a charger for charging a battery of the wireless telephone. The charger can be fixed to the main unit and can be separated from the main unit. When the charger is fixed to the main unit, the battery of the wireless telephone can be charged in the position that is fixed to the main unit. Furthermore, if the charger is placed in a position separated from the main unit, the battery of the wireless telephone can be charged in that position. That is, the charger and the wireless telephone can be utilized even when the charger has been removed from the main unit.

17 Claims, 25 Drawing Sheets

MULTI-FUNCTION DEVICE FOR PERFORMING AT LEAST TELEPHONE COMMUNICATION AND FACSIMILE FUNCTIONS

CROSS-REFERENCE TO RELATED APPLICATION

This application claims priority to Japanese Patent Application No. 2006-061909 filed on Mar. 7, 2006, the contents of which are hereby incorporated by reference into the present application.

BACKGROUND OF THE INVENTION

1. Field of the Invention

The present invention relates to a multi-function device for performing, at least, telephone communication and facsimile functions.

2. Description of the Related Art

Multi-function devices that perform telephone communication and facsimile functions, etc. are widely known. This type of multi-function device comprises a main unit, a telephone, and a telephone holder. The main unit comprises an interface device that communicates with a telephone communication circuit, a facsimile device, and a communication device that communicates with the telephone via a wire or wirelessly.

Furthermore, telephones include telephones to be utilized close to the main unit, and telephones to be utilized at a position separated from the main unit. Below, a telephone to be utilized close to the main unit will be referred to as a base phone, and a telephone to be utilized at a position separated from the main unit will be referred to as a remote phone. Base phones include a base phone that communicates with the main unit via a wire (a wired base phone), and a base phone that communicates wirelessly with the main unit (a cordless base phone). When not in use, the wired base phone is placed in a telephone holder that is integrally formed with the main unit. When not in use, the cordless base phone is charged by being placed on a charger that is integrally formed with the main unit. The remote phone is usually a cordless telephone. The remote phone is charged by being placed on a charger that is in a position separated from the main unit (i.e. a charger that is not fixed to the main unit).

Multi-function devices include multifunction devices provided with a base phone and multi-function devices not provided with a base phone (i.e. multi-function devices provided only with a remote phone).

Furthermore, some users of multi-function devices prefer a multi-function device provided with a base phone because it is easy to use the telephone and the facsimile simultaneously. Other users prefer a multi-function device without a base phone because the base phone is obstructive when using the facsimile, or because the space where the main unit is located is saved, etc.

The present applicants set forth a multi-function device that fulfills the demands of both types of users. This multi-function device comprises a telephone unit that includes of a telephone holder and a telephone coupled, by a cord, with the telephone holder. The telephone unit can be attached to and separated from a main unit. That is, the telephone unit can be utilized as a base phone by attaching the telephone unit to the main unit.

The user can utilize the multi-function device with the telephone unit attached to the main unit. Furthermore, the user can utilize the multi-function device with the telephone unit separated from the main unit. All users can thus utilize the multi-function device as desired.

BRIEF SUMMARY OF THE INVENTION

In the aforementioned multi-function device having a removable telephone unit, the telephone unit could not be utilized when this telephone unit was separated from the main unit. As a result, this created a problem in that the telephone unit became useless. Furthermore, it was possible that the telephone unit that had been separated from the main unit would be lost by the user.

The present invention sets forth a multi-function device comprising a telephone unit that can be attached to and removed from a main unit, and which can be utilized even when it has been separated from the main unit.

The inventors have created a new multi-function device for performing, at least, telephone communication and facsimile functions. The newly developed multi-function device comprises:

a main unit including an interface device for communicating with a telephone communication network, a facsimile device for communicating with the interface device, and a wireless communication device for communicating with the interface device and for communicating with at least one external device wirelessly;

a wireless telephone for communicating wirelessly with the wireless communication device, the wireless telephone including a battery;

a charger for charging the battery while the wireless telephone is mounted on the charger. The charger can be fixed to the main unit and can be separated from the main unit.

In this multi-function device, the charger can be fixed to the main unit, and can be removed from the main unit. When the charger is fixed to the main unit, the battery of the wireless telephone can be charged at the position where the charger is fixed to the main unit. Furthermore, when the charger is placed in a position separated from the main unit, the battery of the wireless telephone can be charged at this position. That is, it is possible to utilize this wireless telephone by placing the charger in a position separated from the main unit and placing the wireless telephone on this charger.

DETAILED DESCRIPTION OF THE INVENTION

Figure 1:
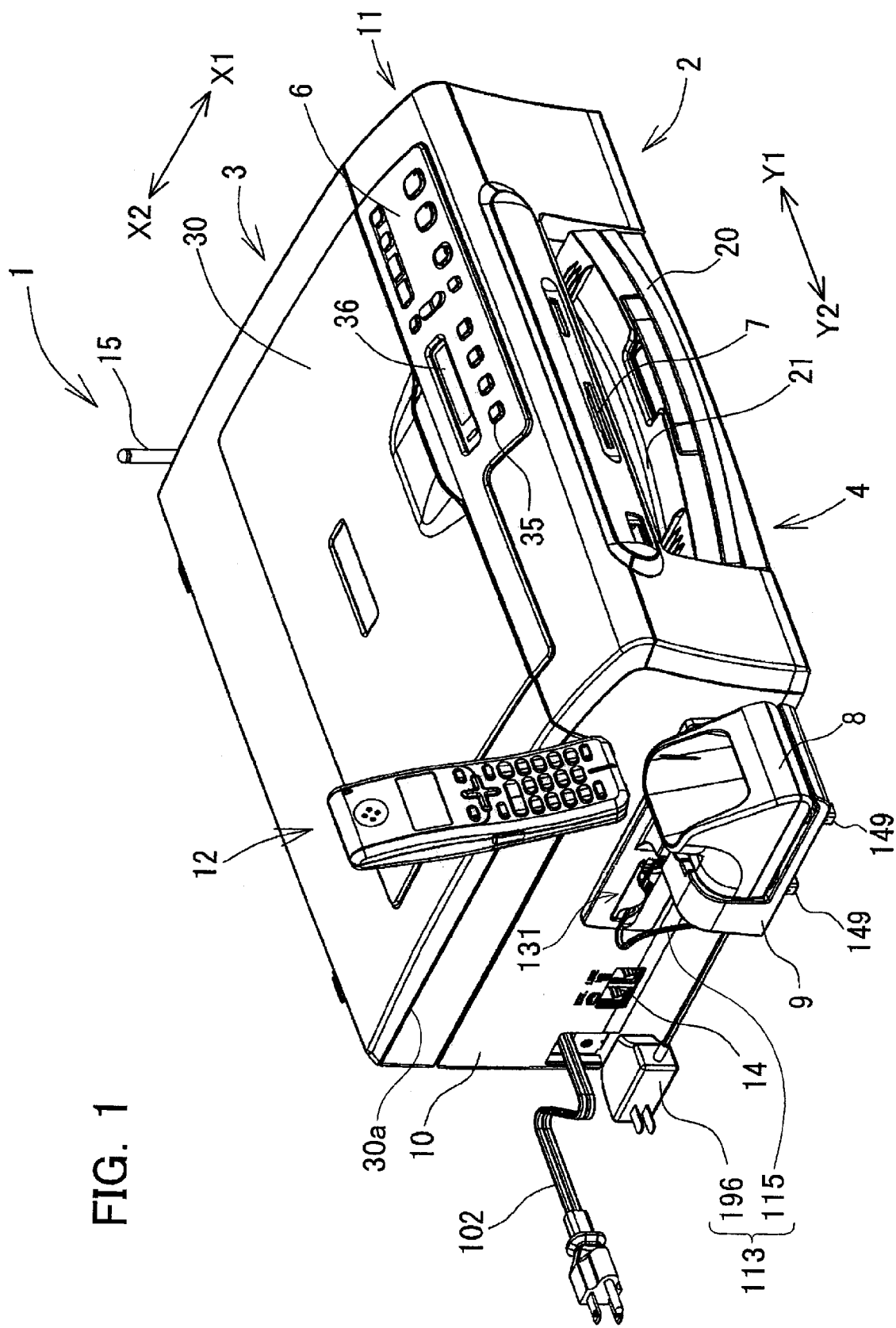
FIG. 1 shows an external perspective view of a multi-function device of a first embodiment.
Figure 4:
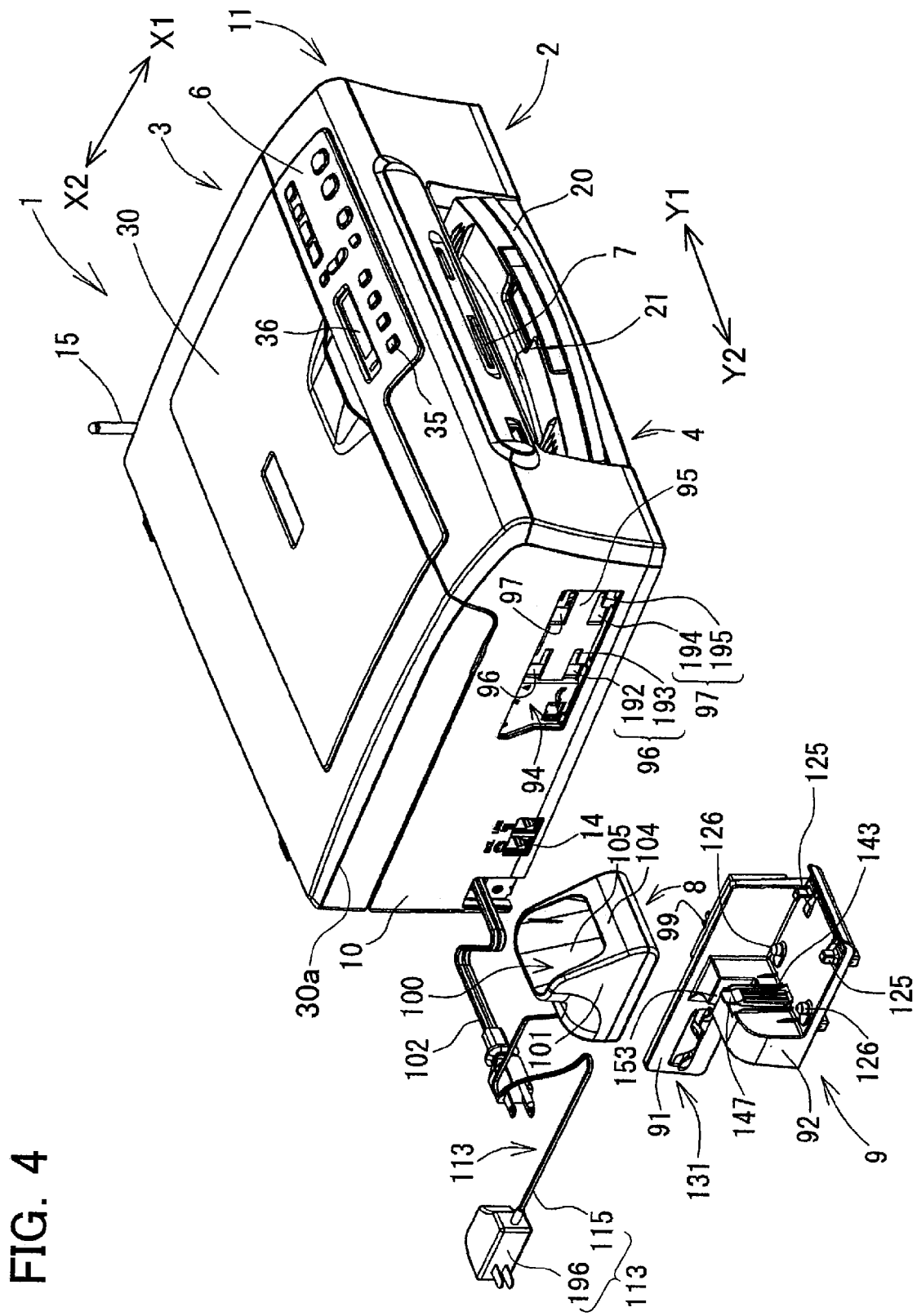
FIG. 4 shows an external perspective view of a multi-function device in a state where a bracket and a holder have been removed from a main unit.

An embodiment of the present invention will be described below with reference to the figures. FIG. 1 and FIG. 4 show a perspective view of a multi-function device 1 of the present embodiment. The multi-function device 1 has a substantially rectangular parallelepiped shaped main unit 11, a bracket 9 capable of being removably attached to the main unit 11, a holder 8 capable of being removably attached to the bracket 9, and a wireless telephone 12 capable of being removably attached to the holder 8. FIG. 1 shows the multi-function device 1 in a state where the bracket 9 and the holder 8 are attached to the main unit 11, and FIG. 4 shows the multi-function device 1 in a state where the bracket 9 and the holder 8 are removed from the main unit 11. In the description below, as shown in FIG. 1 and FIG. 4, the direction of the arrow X1 will be considered the direction toward the front side, the direction of the arrow X2 will be considered the direction toward the rear side, the direction of the arrow Y1 will be considered the direction toward the right side, and the direction of the arrow Y2 will be considered the direction toward the left side.

(Main Unit 11)

Figure 17:
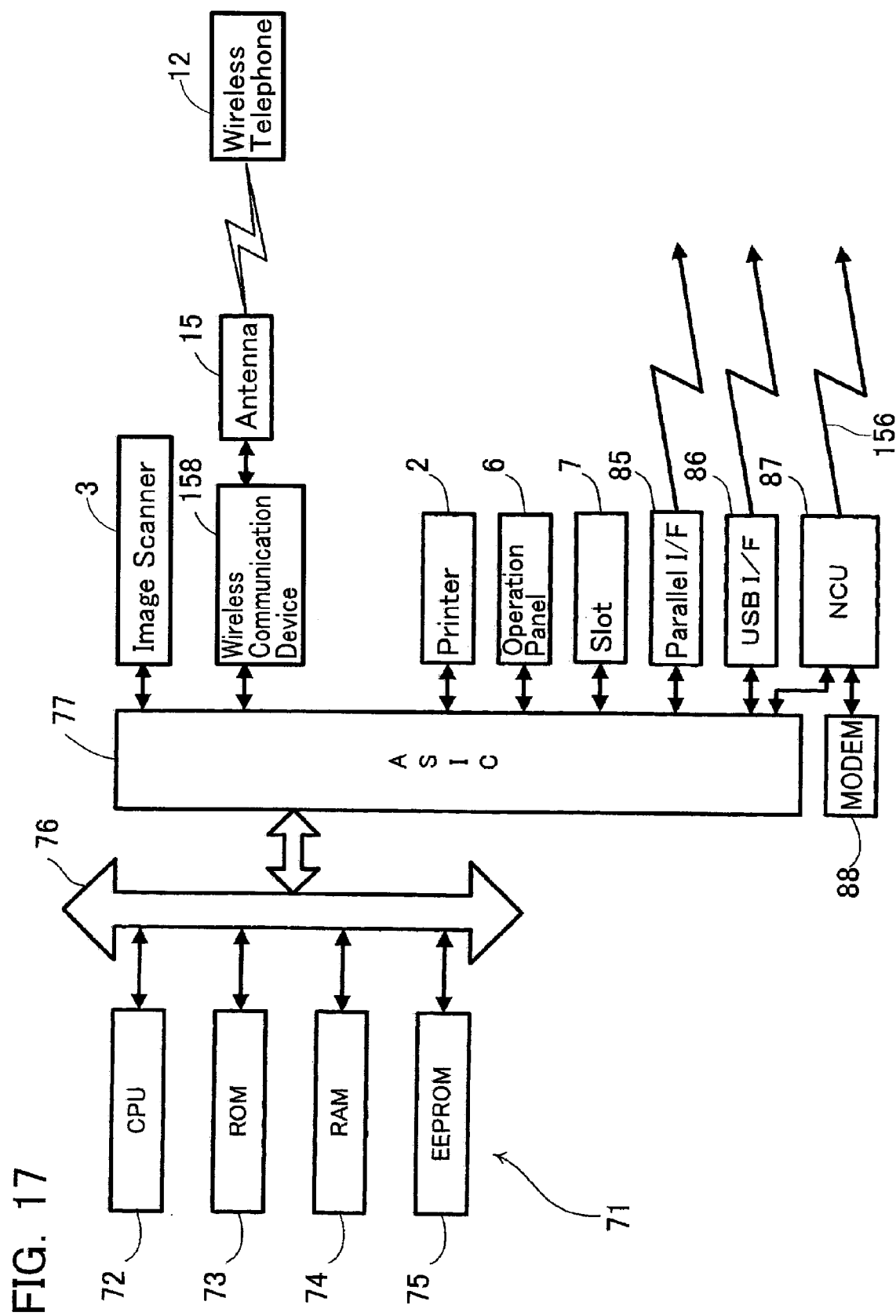
FIG. 17 shows a block diagram of the main unit.

The main unit 11 has a telephone communication function, a facsimile function, a printer function, a scanner function, and a copier function. FIG. 17 is a block diagram schematically showing the configuration of the main unit 11. As shown, the main unit 11 includes an image scanner 3, a wireless communication device 158, an antenna 15, a printer 2, an operation panel 6, a slot 7, a parallel interface 85, a USB interface 86, an NCU 87, and a MODEM 88. A memory card is inserted into the slot 7. The slot 7 is capable of reading data stored in the memory card that has been inserted therein. The parallel interface 85 and the USB interface 86 can be coupled with an external device (such as a computer or the like) via a communication cable. Data can be input from the external device to the main unit 11 by coupling the external device with the parallel interface 85 or the USB interface 86. The NCU 87 is coupled with a telephone communication network 156. Communication between the main unit 11 and the telephone communication network 156 is performed by means of the NCU 87 and the MODEM 88. The wireless telephone 12 communicates with the main unit 11 via the antenna 15 and the wireless communication device 158.

Furthermore, the main unit 11 comprises a bus 76, an ASIC 77, and a controlling portion 71 that comprises a CPU 72, a ROM 73, a RAM 74, and an EEPROM 75. The controlling portion 71 inputs commands to the ASIC 77 via the bus 76. The ASIC 77 commands various components in accordance with the commands that have been input.

The main unit 11 communicates with the wireless telephone 12 by means of the wireless communication device 158 and the antenna 15, and communicates with the telephone communication network 156 by means of the NCU 87 and the MODEM 88. The telephone communication function is thus realized.

The main unit 11 reads an image by means of the image scanner 3, and transmits the image to the telephone communication network 156 by means of the NCU 87 and the MODEM 88. Facsimile transmission is thus realized. Furthermore, the main unit 11 receives image data from the telephone communication network by means of the NCU 87 and the MODEM 88, and uses the printer 2 to print the received image data. Facsimile reception is thus realized.

The main unit 11 uses the printer 2 to print image data received from the slot 7, the parallel interface 85 or the USB interface 86. The printer function is thus realized.

The main unit 11 reads an image by means of the image scanner 3, and outputs the image data that has been read to the slot 7, or to a device coupled with the parallel interface 85 or the USB interface 86. The scanner function is thus realized.

The main unit 11 reads an image by means of the image scanner 3, and uses the printer 2 to print the image data that has been read. The copy function is thus realized.

Figure 2:
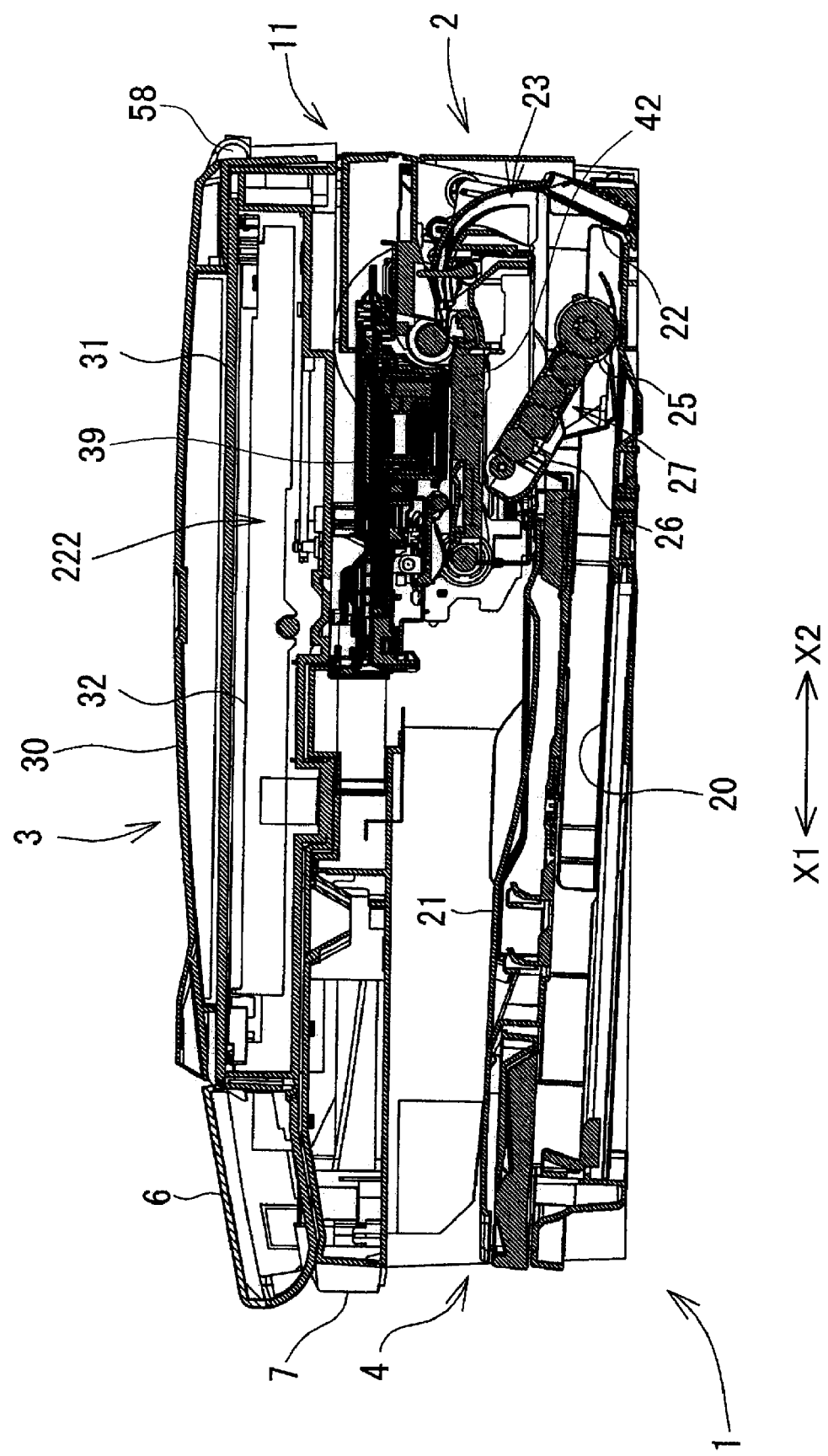
FIG. 2 shows a schematic cross-sectional view of the internal configuration of the multi-function device of the first embodiment.

As shown in FIGS. 1 and 4, the printer 2 is located at a lower portion of the main unit 11. FIG. 2 shows a vertical cross-sectional view along the front-rear direction of the main unit 11. As shown in the figure, the printer 2 comprises a paper feeding tray 20, a paper feeding mechanism 27, an oblique plate 22, a paper feeding passage 23, an ink jet head 39, a platen 42, and a paper discharge tray 21. As shown in FIG. 1, the paper feeding tray 20 is positioned within an opening 4 formed in a lower portion of a front surface of the main unit 11. The paper feeding tray 20 can be inserted and removed in the front-rear direction with respect to the main unit 11. A plurality of sheets of paper can be housed in the paper feeding tray 20. The paper feeding tray 20 can house various types of paper, such as A4 size, B5 size, postcard size, etc. The paper feeding mechanism 27 comprises an arm 26, and a roller 25 attached to a tip of the arm 26. The paper feeding mechanism 27 is disposed such that the roller 25 makes contact with the paper in the paper feeding tray 20. By rotating, the roller 25 transports the uppermost sheet of paper in the paper feeding tray 20 toward the oblique plate 22. By making contact with the paper transported by the roller 25, the oblique plate 22 guides the paper toward the paper feeding passage 23. By making contact with the paper, the oblique plate 22 prevents two or more sheets of paper from being transported to the paper feeding passage 23. The paper feeding passage 23 guides the paper between the ink jet head 39 and the platen 42. When the paper passes between the ink jet head 39 and the platen 42, ink droplets are discharged toward the paper from the ink jet head 39. An image is thus printed on the paper. The paper that has passed between the ink jet head 39 and the platen 42 is ejected to the paper discharge tray 21. As shown in FIG. 1, the paper discharge tray 21 is situated at a top portion of the opening 4.

As shown in FIGS. 1 and 4, the image scanner 3 is located at a top portion of the main unit 11. As shown in FIG. 2, the image scanner 3 comprises a cover plate 30 and an image reading portion 222. The cover plate 30 forms substantially the entirety of a top surface of the main unit 11. In addition, a right edge portion and a left edge portion of the cover plate 30 are bent downward. As a result, a right side surface and a left side surface of the cover plate 30 form the top portion of a right side wall and a left side wall 10, respectively, of the main unit 11 when the cover plate 30 is in a closed state. The cover plate 30 can be rotated around a hinge 58 shown in FIG. 2. That is, the cover plate 30 can be opened and closed. As shown in FIG. 2, the image reading portion 222 is disposed below the cover plate 30. The image reading portion 222 is a flat bed scanner. The image reading portion 222 comprises a flat platen glass 31 and an image sensor 32. As shown, the image sensor 32 is disposed along the front-rear direction with respect to the main unit 11. The image sensor 32 can reciprocate along the left-right direction of the main unit 11. By reciprocating, the image sensor 32 reads the image of a document set on the platen glass 31. When the cover plate 30 is opened, the platen glass 31 of the image reading portion 222 is exposed. The document is placed on the platen glass 31, the desired operation is performed, and the image sensor 32 scans the document on the platen glass 31. The image of the document is thus read.

The wireless communication device 158 is disposed within the main unit 11. The antenna 15 is attached to the right side wall of the main unit 11. The wireless communication device 158 wirelessly communicates with the wireless telephone 12 via the antenna 15. Furthermore, the wireless communication device 158 communicates with the NCU 87 and the MODEM 88.

The NCU 87 and the MODEM 88 are disposed within the main unit 11. A socket 14 is formed at the left side wall 10 of the main unit 11. The telephone communication network 156 is coupled to the socket 14 via telephone communication wire. When the telephone communication wire is coupled to the socket 14, the telephone communication network 156 and the NCU 87 are electrically connected. As described above, telephone communication between the wireless telephone 12 and the telephone communication network 156 is performed by the wireless communication device 158 and the antenna 15 communicating wirelessly with the wireless telephone 12, and the NCU 87 and the MODEM 88 communicating with the telephone communication network 156. Furthermore, the NCU 87 and the MODEM 88 transmit and receive image data to and from the telephone communication network 156 when the facsimile function is utilized.

The operation panel 6 is located at a front side of the top surface of the main unit 11. The operation panel 6 comprises operation buttons 35 and a liquid crystal display 36. The liquid crystal display 36 displays words or an image based on the commands input from the ASIC 77. As a result, the user can operate the operation buttons 35 while verifying the state of the main unit 11 by viewing the liquid crystal display 36. Commands are input to the controlling portion 71 when the operation buttons 35 are operated. The controlling portion 71 outputs commands to the ASIC 77 based on the commands that have been input. The ASIC 77 controls various components based on the commands input from the controlling portion 71. The main unit 11 can thus be made to perform the desired operations by operating the operation buttons 35. In the situation where the main unit 11 is coupled with an external device via the parallel interface 85 or the USB interface 86, the main unit 11 can also be operated by inputting commands to the main unit 11 from the external device.

The slot 7 is located in the front surface of the main unit 11. A memory card that stores image data taken with a digital camera or the like is inserted into the slot 7, the desired operation is initiated via the operation panel 6, whereupon the image data is read from the slot 7. The image data that has been read can be displayed on the liquid crystal display 36. Furthermore, the image data that has been read can also be printed by the printer 2.

As shown in FIG. 4, an opening 94 is formed in a left side wall 10 of the main unit 11. A frame 95 that is part of the supporting structure of the main unit 11 is exposed within the opening 94. A clearance is formed at an inner side of the frame 95. A pair of long holes 96 and another pair of long holes 97, which penetrate into the clearance, are formed at the frame 95. The long holes 96 are formed such that their openings extend along the front-rear direction. The rear section of each of the long holes 96 forms an insertion hole 192 that is broad in width. Engaging holes 193, which grow narrower in width toward the front, extend from the insertion holes 192. Each of the pair of long holes 96 is disposed as a mirror image of the other long hole 96 in the up-down direction. The long holes 97 are formed such that their openings extend along the front-rear direction. The rear section of each of the long holes 97 forms an insertion hole 194 that is broad in width. Engaging holes 195, which grow narrower in width toward the front, extend from the insertion holes 194. Each of the pair of long holes 97 is disposed as a mirror image of the other long hole 97 in the up-down direction. The bracket 9 can be removably attached to the opening 94.

As shown in FIG. 1, a power cord 102 extends from the left side wall 10 of the main unit 11. The power cord 102 supplies electric power to the main unit 11.

(Bracket 9)

The bracket 9 can be attached to and removed from the opening 94. Furthermore, the holder 8 can be attached to and removed from the bracket 9. FIGS. 10 to 15 show a left side surface view, a top surface view, a front surface view, a rear surface view, a bottom surface view, and a right side surface view of the bracket 9. The bracket 9 comprises a substantially flat, plate-shaped attaching plate 91, and a mounting platform 92 that is formed integrally with the attaching plate 91.

Figure 10:
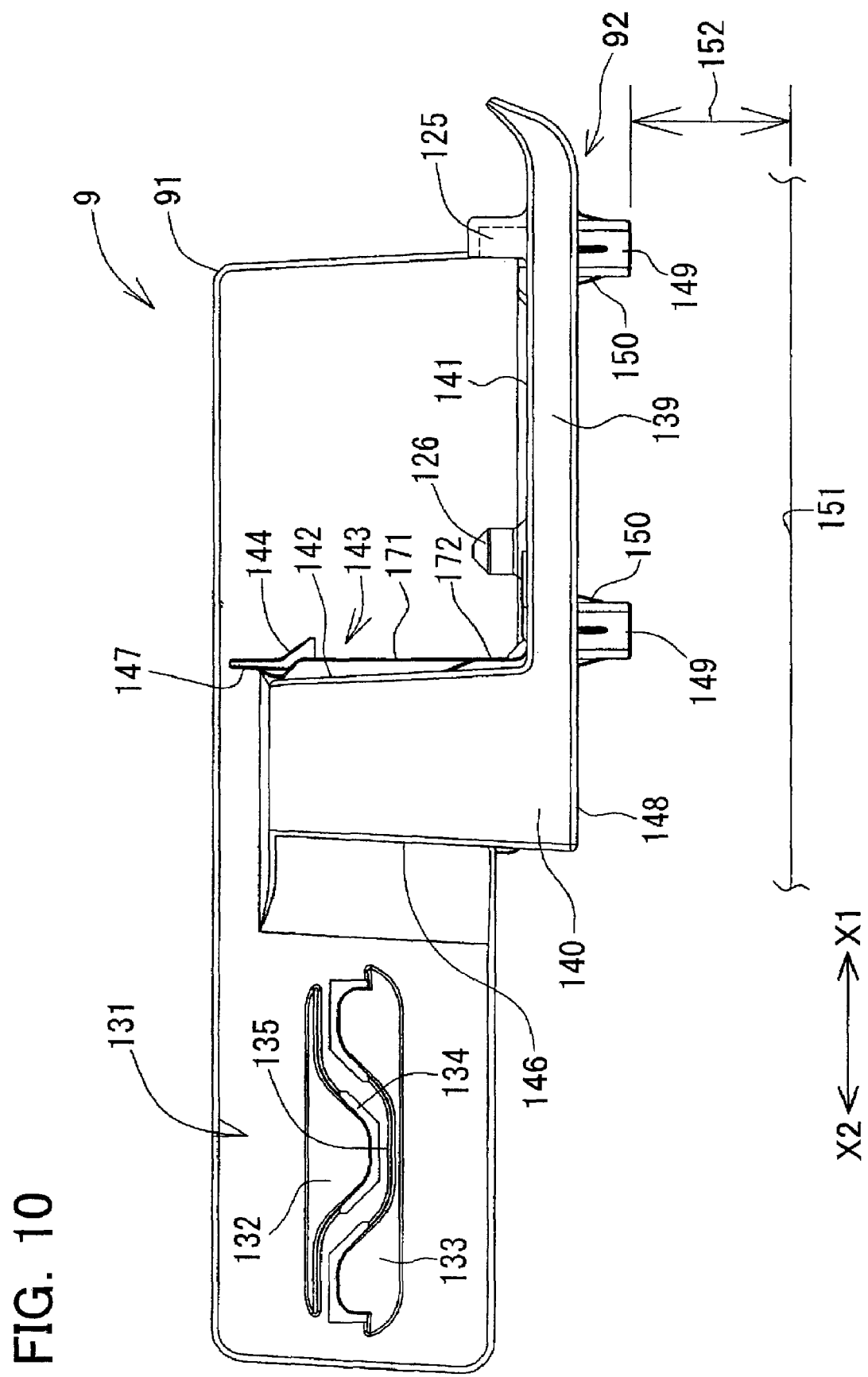
FIG. 10 shows a left side surface view of the bracket.
Figure 11:
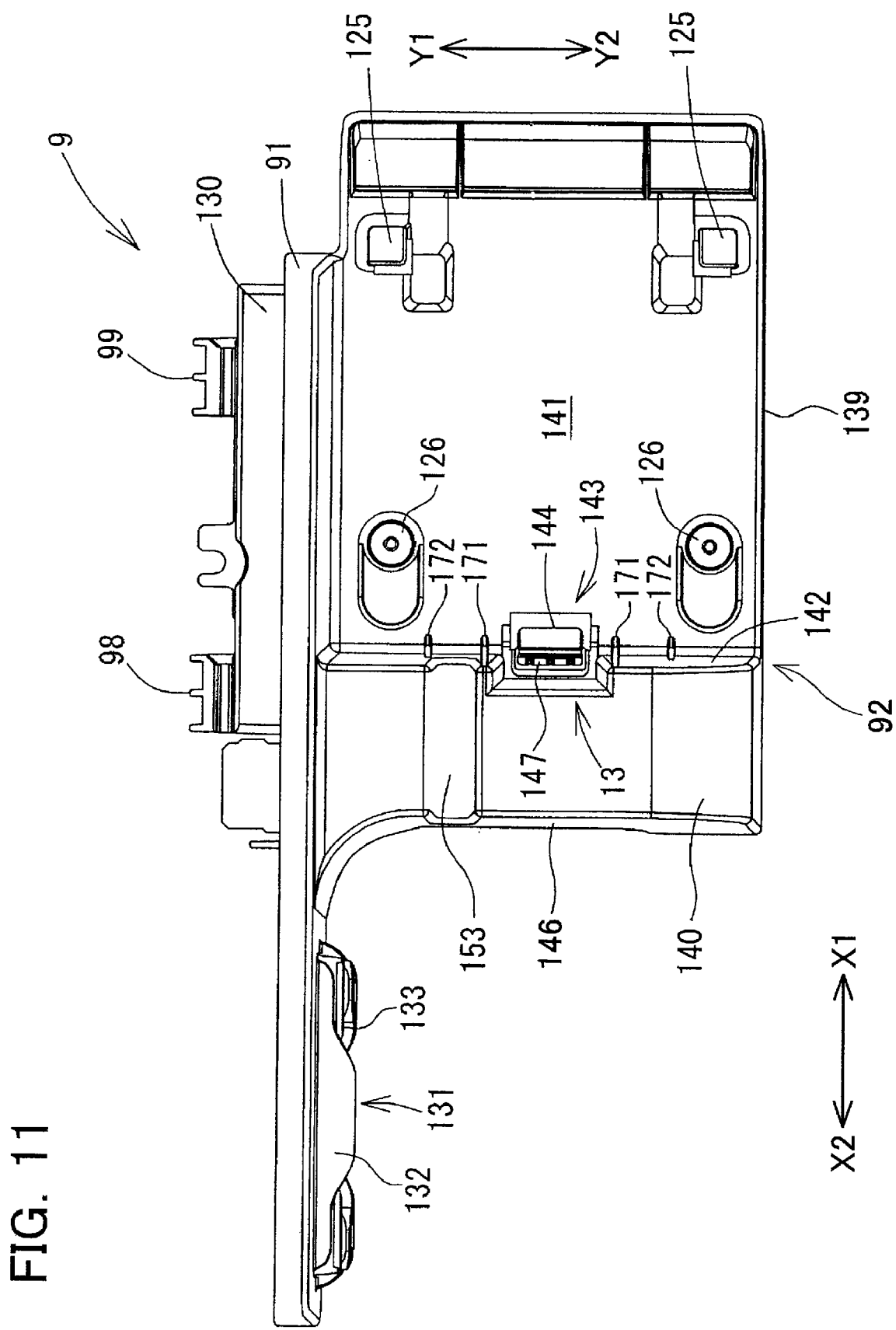
FIG. 11 shows a top surface view of the bracket.
Figure 13:
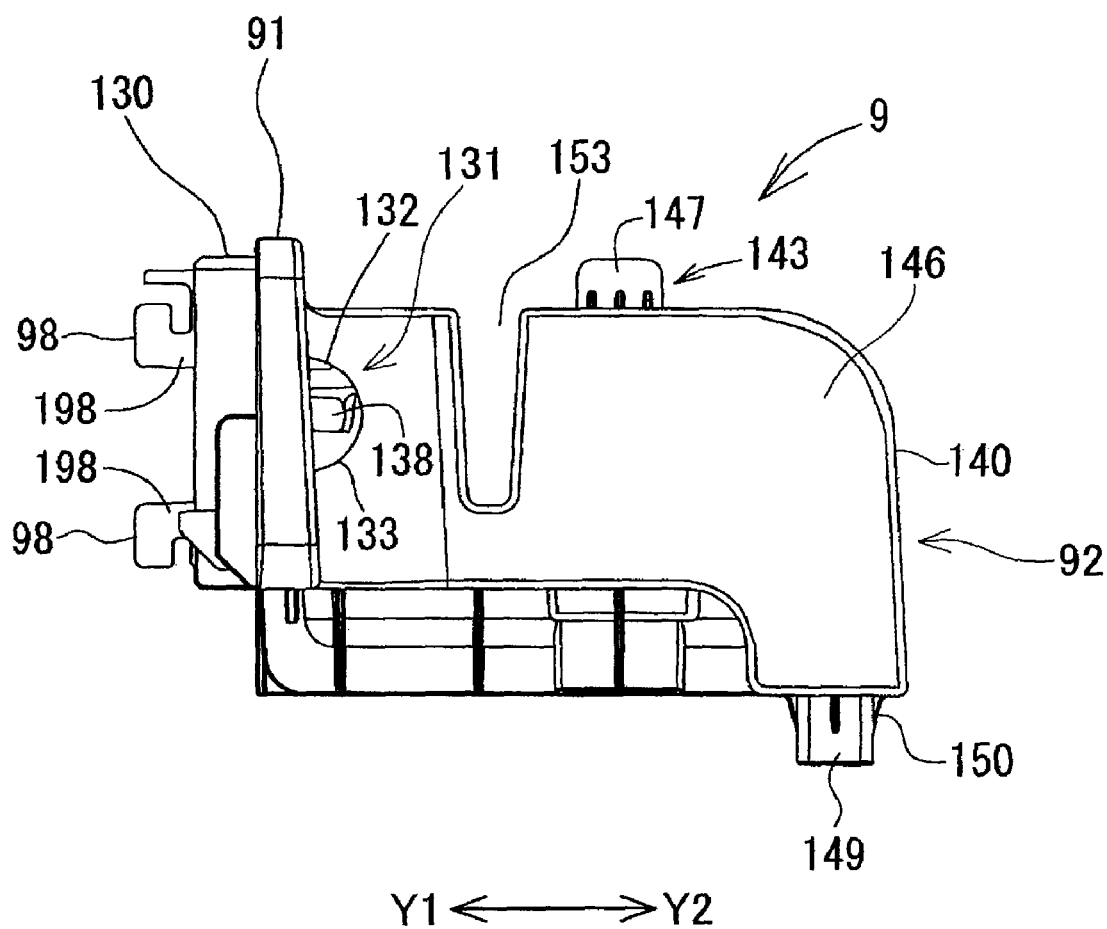
FIG. 13 shows a rear surface view of the bracket.
Figure 14:
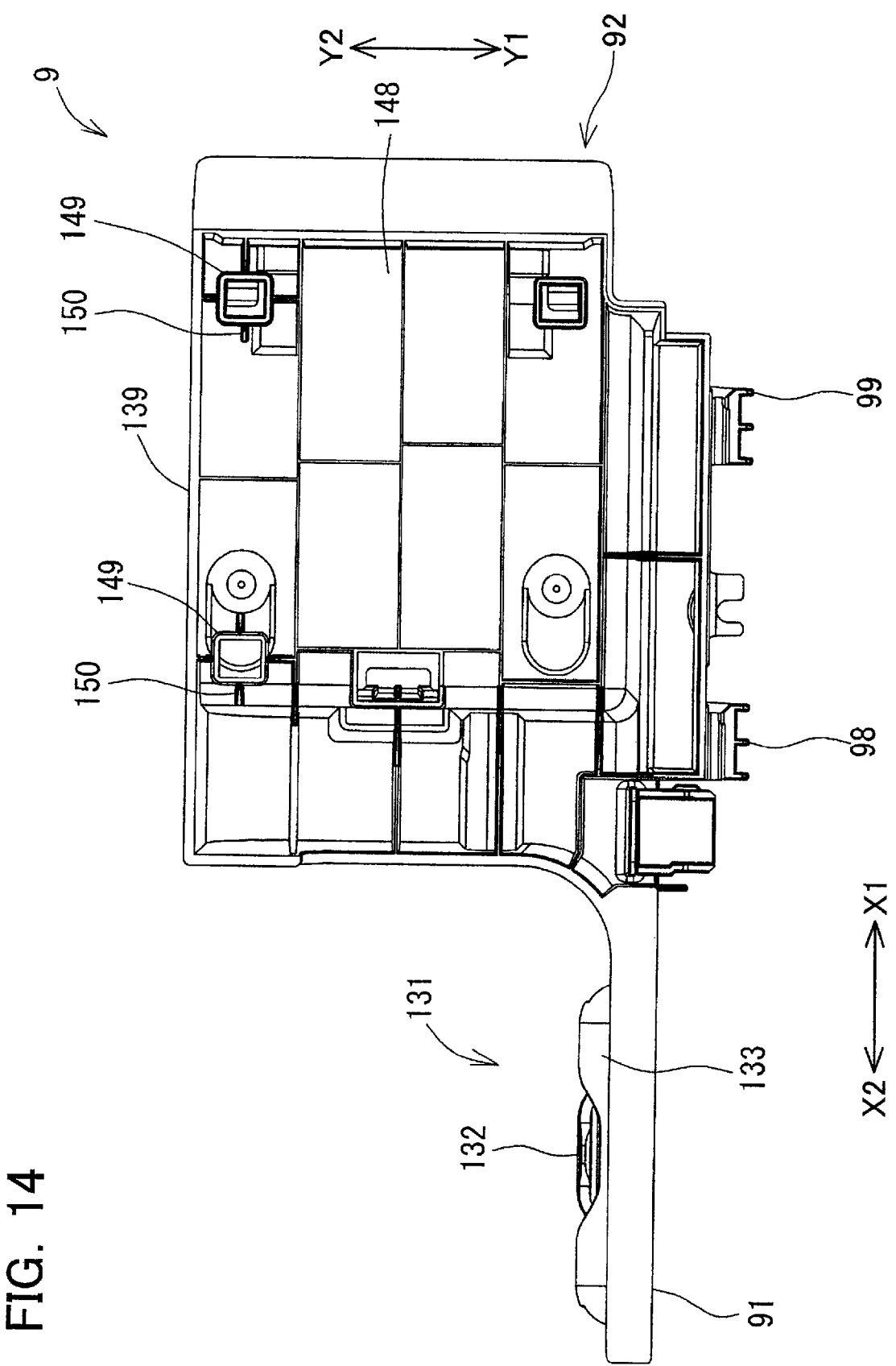
FIG. 14 shows a bottom surface view of the bracket.
Figure 15:
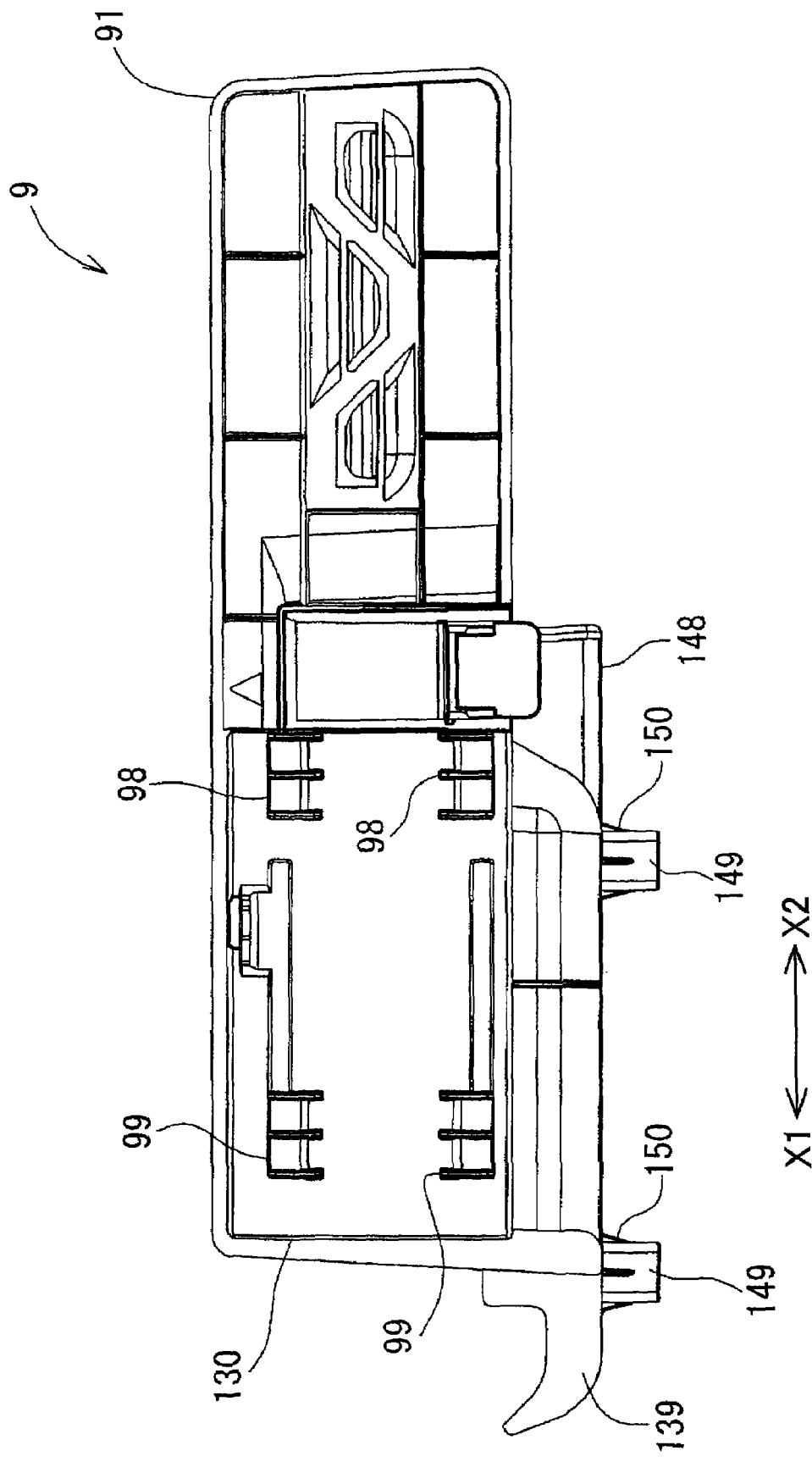
FIG. 15 shows a right side surface view of the bracket.

As shown in FIGS. 10 and 11, a cord holding portion 131 is formed in a surface (a proximate surface) of the attaching plate 91. As shown in FIG. 1, the cord holding portion 131 is a member for holding a cord 115 (to be described) when the holder 8 is attached to the bracket 9. The cord holding portion 131 is formed at a rear side of the attaching plate 91. The cord holding portion 131 includes a top plate 132 and a bottom plate 133. The top plate 132 and the bottom plate 133 are attached so as to face one another. An edge surface of the top plate 132 has a convex shape. An edge surface of the bottom plate 133 has a concave shape that corresponds to the edge surface of the top plate 132. A V-shaped clearance is formed between the two. As shown in FIG. 13, the top plate 132 and the bottom plate 133 are attached so as to protrude from the surface of the attaching plate 91. A space 138 surrounded by the top plate 132, the bottom plate 133, and the surface of the attaching plate 91 extends along the front-rear direction. As shown in FIG. 1, the cord 115 is supported so as to extend along the front-rear direction by being inserted into the space 138.

Figure 12:
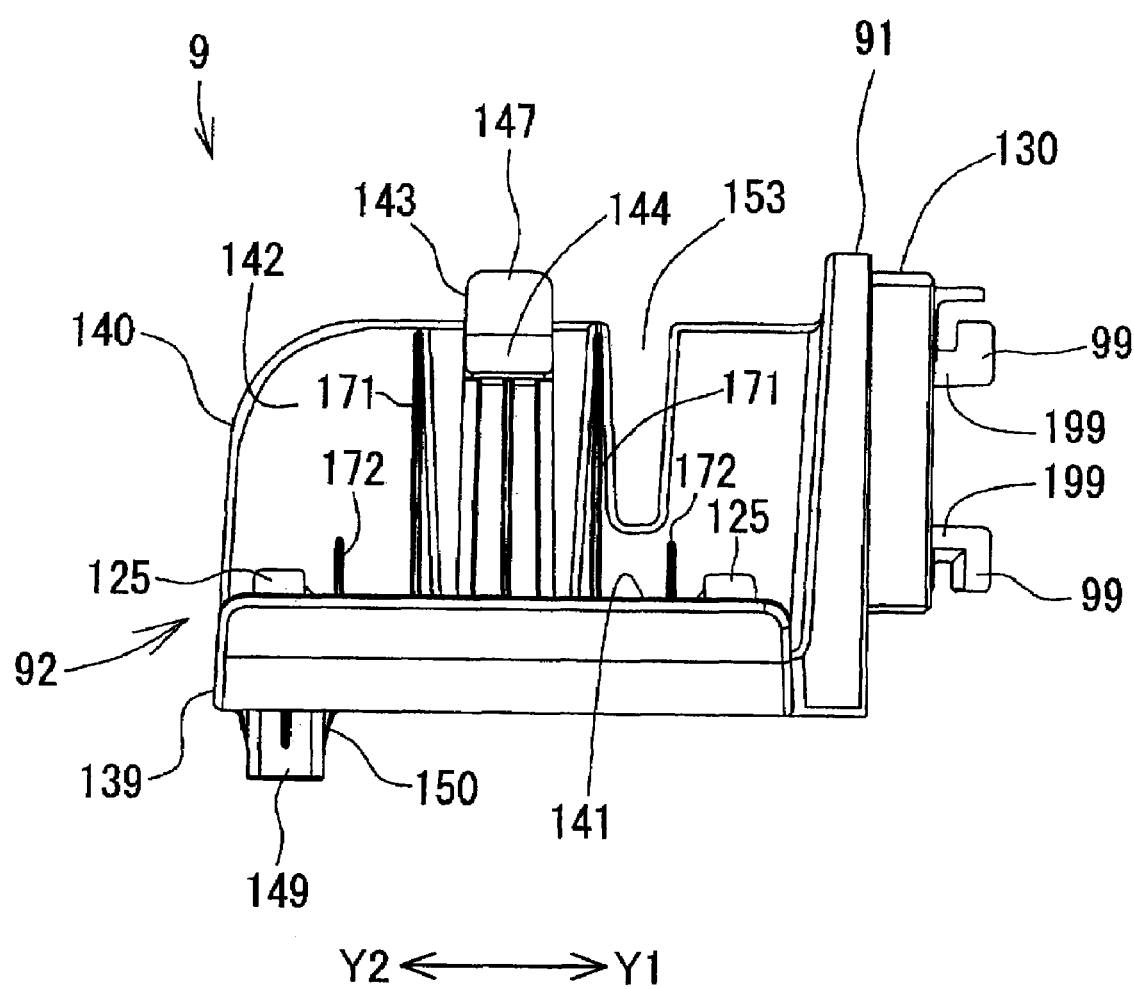
FIG. 12 shows a front surface view of the bracket.

As shown in FIGS. 11, 12, 13, and 15, a base 130 is formed at an inner surface of the attaching plate 91. Engaging members 98 and 99 are formed on the base 130. The engaging members 98 and 99 are formed at a front side of the attaching plate 91. As shown in FIG. 12, the engaging member 99 is formed in an L-shape. As shown in FIG. 13, the engaging member 98 is also formed in an L-shape. The engaging members 98 and 99 are capable of engaging with the long holes 96 and 97 of the main unit 11.

When the bracket 9 is to be attached to the main unit 11, the bracket 9 is pushed onto the main unit 11 such that the engaging members 98 and 99 are inserted into the insertion holes 192 and 194. Then the bracket 9 is slid toward the front. Thereupon, base end portions 198 and 199 of the engaging members 98 and 99 are guided by the engaging holes 193 and 195, and tip end portions of the engaging members 98 and 99 enter the clearance at the inner side of the frame 95. When the bracket 9 is slid a predetermined distance, a front end of the base 130 makes contact with a front end of the opening 94, and the bracket 9 is fixed. Furthermore, when the bracket 9 is slid toward the rear, the bracket 9 can be separated from the main unit 11 by being lifted out from the opening 94.

The mounting platform 92 includes a mounting plate 139 and a wall portion 140. When the bracket 9 is attached to the main unit 11, the mounting plate 139 is substantially horizontal, and the wall portion 140 is substantially vertical.

Two leg portions 149 are formed at a left side of a bottom surface 148 of the mounting plate 139. Ribs 150 that strengthen the leg portions 149 are formed around the exterior perimeter of each of the leg portions 149. As shown in FIG. 10, the leg portions 149 are formed such that a predetermined clearance 152 is formed between the lower ends of the leg portions 149 and a disposing surface 151 of the main unit 11 when the bracket 9 is fixed to the main unit 11. That is, the leg portions 149 are formed such that lower ends of the leg portions 149 are maintained in positions higher than a bottom surface of the main unit 11. That is, the leg portions 149 are formed such that the leg portions 149 and the disposing surface 151 do not make contact. Furthermore, it is preferred that the predetermined clearance 152 is 1 mm to 3 mm.

It is easier to manufacture the bracket 9 when a clearance is formed between the leg portions 149 and the disposing surface 151. For example, the bracket 9 must be formed with an extremely high degree of precision when the leg portions 149 are formed so as to make contact with the disposing surface 151. If the leg portions 149 protrude beyond the main unit 11 toward the disposing surface 151 due to manufacturing error, it will become impossible to place the main unit 11 stably on the disposing surface 151. However, since the bracket 9 of the present embodiment is formed such that the leg portions 149 and the disposing surface 151 do not make contact, it is not necessary to manufacture the bracket 9 with such a high degree of precision, and as a result, manufacturing is easier.

Furthermore, damage to the bracket 9 is prevented when the lower ends of the leg portions 149 are in positions higher than the bottom surface of the main unit 11. For example, when the user is performing the operation of placing the main unit 11 on the disposing surface 151 while the bracket 9 is attached to the main unit 11, the bracket 9 may make contact with the disposing surface 151. However, if the lower ends of the leg portions 149 are in positions higher than the bottom surface of the main unit 11, the bracket 9 does not readily make contact with the disposing surface 151 when the main unit 11 is placed.

Furthermore, the bracket 9 may bend due to the user placing the holder 8 or the wireless telephone 12 forcefully onto the bracket 9. The bracket 9 may be damaged if it bends a great deal. In the multi-function device 1 of the present embodiment, however, an adequate clearance is formed between the leg portions 149 and the disposing surface 151. As a result, the leg portions 149 make contact with the disposing surface 151 when the bracket 9 is bent. The bracket is thus prevented from bending further, and damage to the bracket 9 is prevented.

Figure 16:
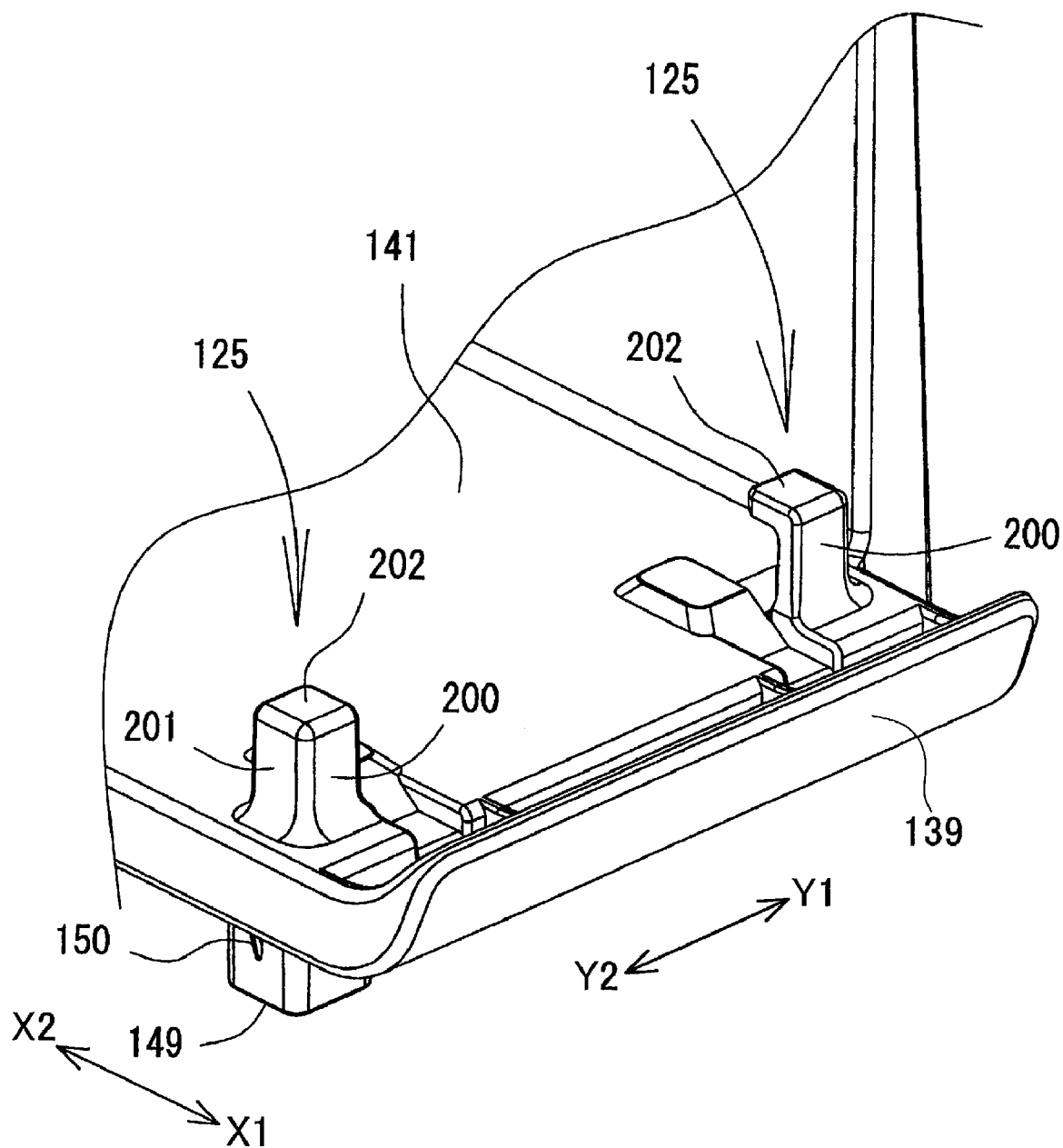
FIG. 16 shows an enlarged view of L-shaped anchors of the bracket.

A top surface of the mounting plate 139 forms a mounting surface 141 upon which the holder 8 is placed. A pair of L-shaped anchors 125 is formed at a front end of the mounting surface 141. FIG. 16 shows an enlarged view of the L-shaped anchors 125. As shown in the figure, the pair of L-shaped anchors 125 is disposed on the mounting surface 141 so as to be left-right mirror images of each other. The L-shaped anchors 125 include an anterior portion 200 that extends upward planar to the left-right direction from the mounting surface 141, a lateral portion 201 that extends upward planar to the front-rear direction from the mounting surface 141, and a horizontal portion 202 formed at a top end of the anterior portion 200 and the lateral portion 201. In vertical cross-section (vertical cross-section in the front-rear direction, vertical cross-section in the left-right direction), the L-shaped anchors 125 form L-shapes.

As shown in FIGS. 4, 10, and 11, a pair of pins 126 is formed at a rear side of the mounting surface 141. The pins 126 are disposed as a left-right mirror image on the mounting surface 141. The pins 126 protrude in a column shape. The tips of the pins 126 grow gradually narrower.

As shown in FIGS. 10 to 12, a surface (a front surface 142 of the wall portion 140) extends upward from the rear side of the mounting surface 141. A pair of ribs 171 that extends in the up-down direction protrudes toward the front from the front surface 142. The pair of ribs 171 is disposed as a left-right mirror image on the front surface 142. A pair of ribs 172 that extends in the up-down direction protrudes toward the front from the front surface 142. The pair of ribs 172 is disposed as a left-right mirror image on the front surface 142.

A resilient plate 143 is disposed at a central position in the left-right direction at the rear side of the mounting surface 141. The resilient plate 143 is a belt-shaped member that extends substantially perpendicularly upward from the mounting surface 141. Furthermore, a concave portion 13 is formed in a part of the front surface 142 on the rear side of the resilient plate 143. A clearance is thus formed between the resilient plate 143 and the front surface 142. The resilient plate 143 is capable of bending toward the rear by means of elastic deformation. Additionally, a protruding portion 144 that protrudes toward the front is formed at a top portion of the resilient plate 143. Furthermore, a handle 147 that extends upward from the protruding portion 144 is formed on the resilient plate 143.

As shown in FIGS. 11 to 13, a groove 153 that extends in the front-rear direction is formed in the wall portion 140. The groove 153 extends from the front surface 142 to a rear surface 146 of the wall portion 140.

(Holder 8)

Figure 5:
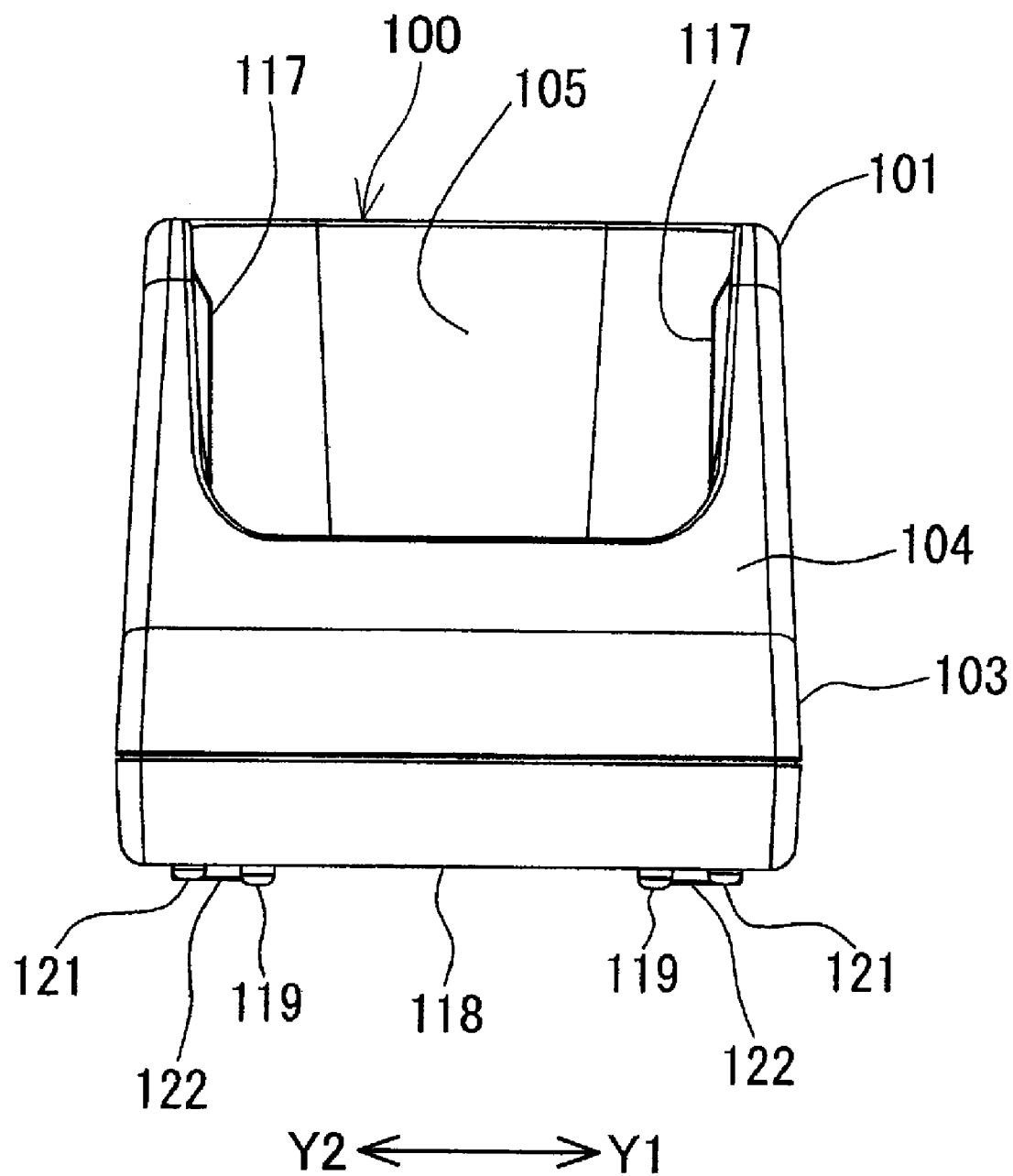
FIG. 5 shows a front surface view of the holder.

The holder 8 can be attached to and removed from the bracket 9. Furthermore, the holder 8 charges the wireless telephone 12 by means of holding this wireless telephone 12. FIGS. 5 to 9 show a front surface view, a right side surface view, a top surface view, a bottom surface view, and a rear surface view of the holder 8. As shown in the figures, an attachment hole 100 for placing the wireless telephone is formed at a top portion of the holder 8. The attachment hole 100 extends in a substantially up-down direction. As a result, a top side of the holder 8 forms a cylindrical shaped portion 101 that surrounds the attachment hole 100, and a bottom side of the holder 8 forms a base portion 103. The attachment hole 100 is somewhat inclined toward the rear. That is, a rear inner surface 105 of the attachment hole 100 is inclined toward the rear. A front surface 104 of the holder 8 is inclined toward the rear. As shown in FIGS. 5 and 7, a pair of ribs 117 that protrudes from an inner surface is formed within the attachment hole 100. The pair of ribs 117 is disposed as a left-right mirror image. The ribs 117 extend in the up-down direction. As shown in FIG. 7, a pair of electrodes 114 is formed at a bottom surface 116 of the attachment hole 100.

Figure 6:
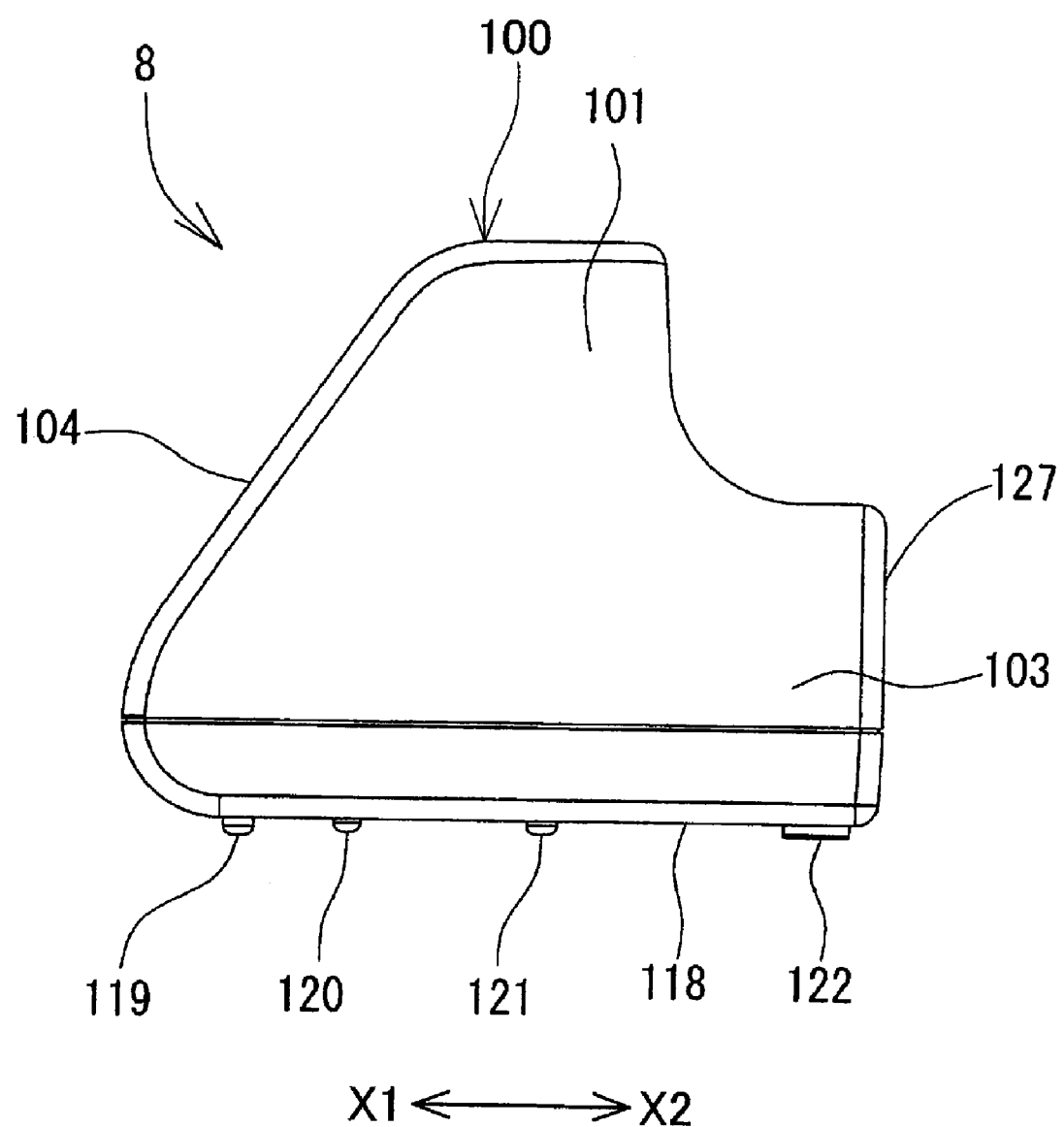
FIG. 6 shows a right side surface view of the holder.
Figure 7:
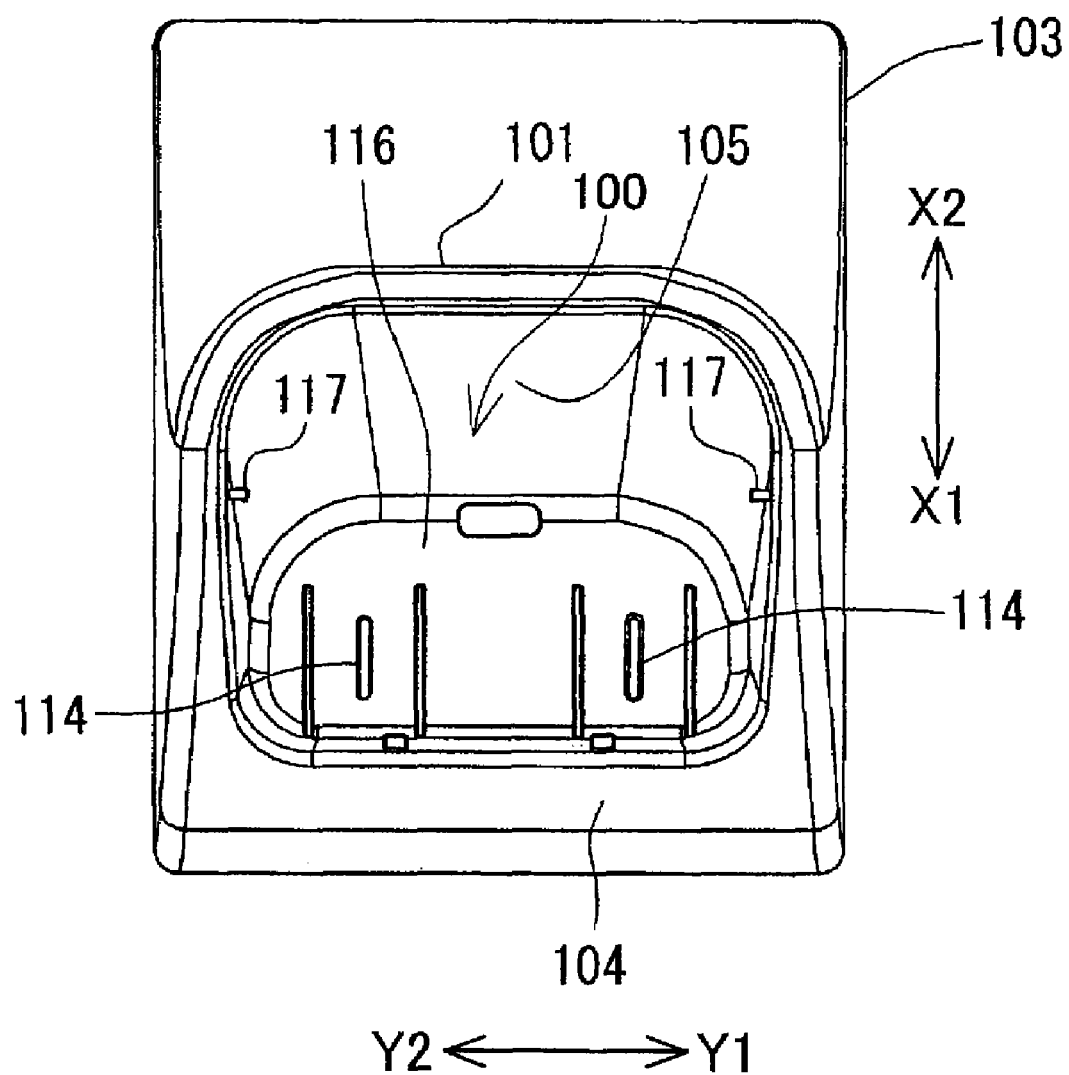
FIG. 7 shows a top surface view of the holder.
Figure 8:
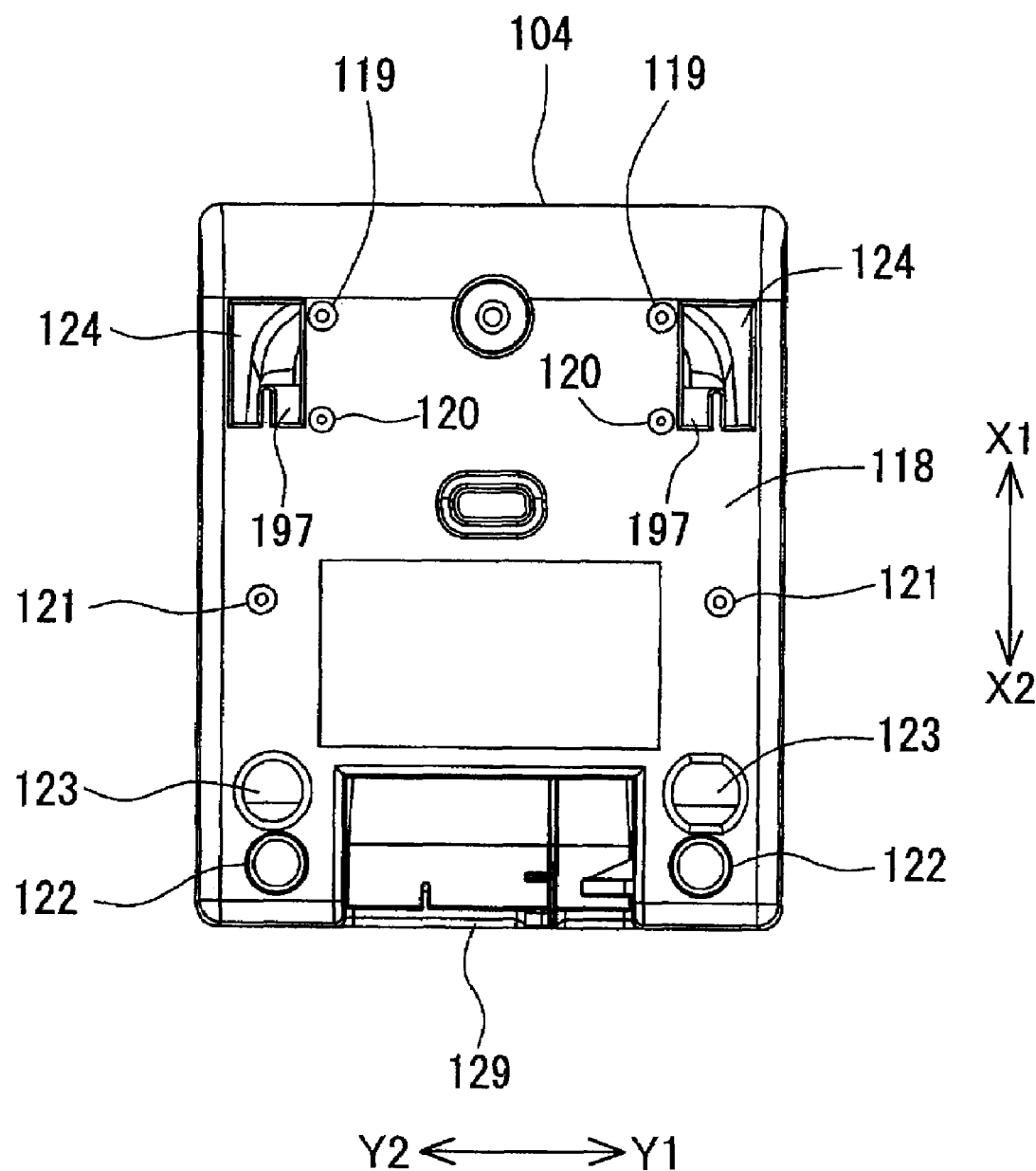
FIG. 8 shows a bottom surface view of the holder.

As shown in FIGS. 5, 6, and 8, a bottom surface (lower surface) 118 of the holder 8 is formed in a flat surface shape. Small protrusions 119 to 122 that protrude downward are formed on the bottom surface 118. The height of the small protrusions 119 to 122 is approximately 0.5 mm (0.3 mm to 1.0 mm is preferred). The small protrusions 119 to 122 are formed such that all the small protrusions 119 to 122 make contact with a flat surface when the holder 8 is placed thereon. That is, the bottom surface 118 is formed in a shape that allows the holder 8 to be placed stably on a flat surface.

A pair of holes 124 is formed in the bottom surface 118. The pair of holes 124 is disposed as a left-right mirror image at a front side of the bottom surface 118. The holes 124 are substantially rectangular. A plate 197 is attached to a corner of each of the holes 124. The pair of holes 124 is formed so as to be capable of engaging with the pair of L-shaped anchors 125 of the bracket 9.

A pair of holes 123 is formed in the bottom surface 118. The pair of holes 123 is disposed as a left-right mirror image at a rear side of the bottom surface 118. The holes 123 are substantially circular. The pair of holes 123 is formed so as to be capable of engaging with the pair of pins 126 of the bracket 9.

Figure 9:
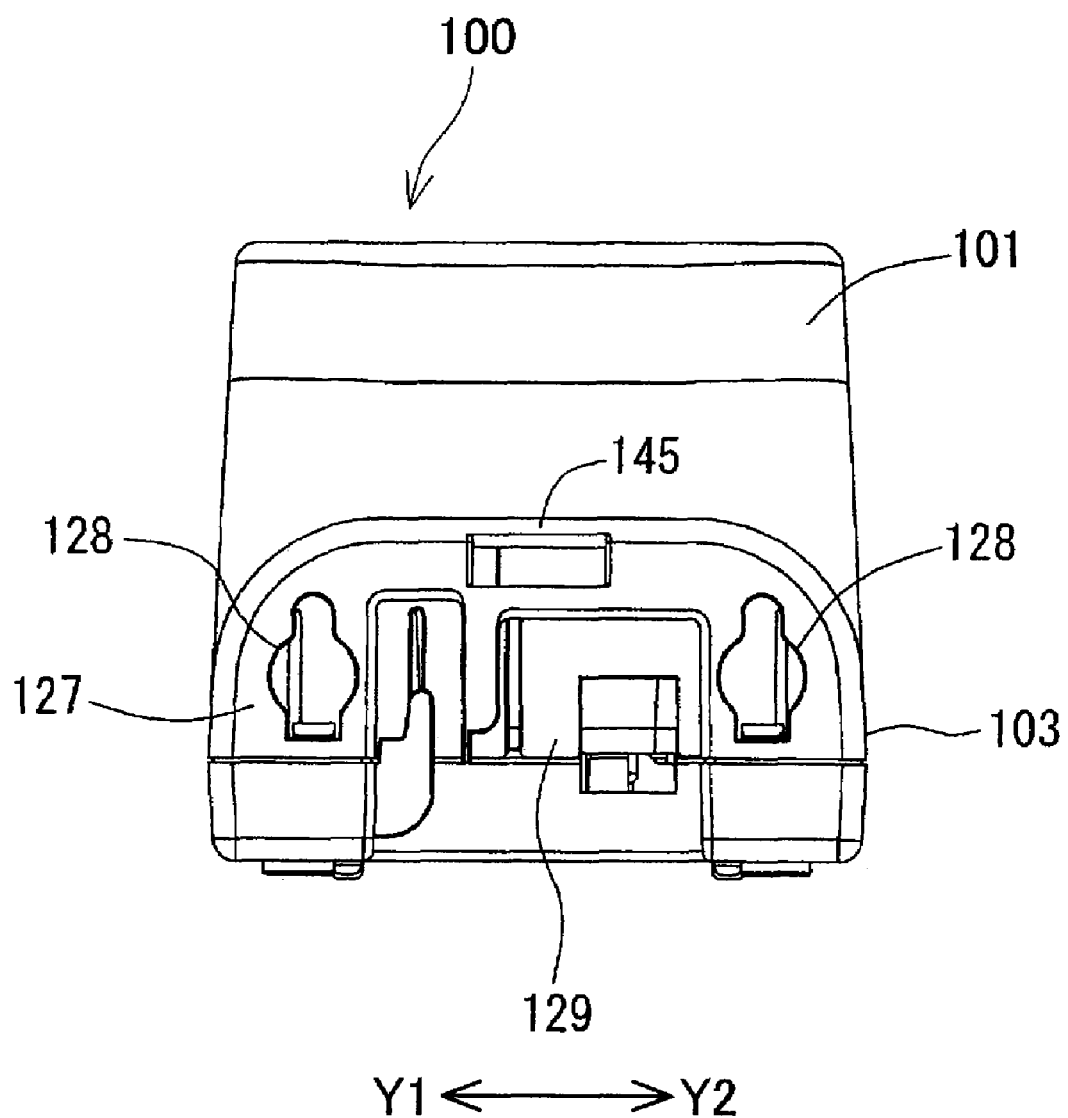
FIG. 9 shows a rear surface view of the holder.

As shown in FIG. 6, a rear surface 127 of the holder 8 is formed so as to be substantially perpendicular. As shown in FIG. 9, a pair of long holes 128 that extends in the up-down direction is formed in the rear surface 127. The holder 8 can, for example, be attached to the wall of a room by engaging the long holes 128 with pins located on the wall of the room.

A socket 129 is formed at the rear surface 127. A power cord 113 (to be described) is connected to the socket 129.

A substantially rectangular concave portion 145 is formed at a top portion of the rear surface 127. The concave portion 145 is formed so as to be capable of engaging with the resilient plate 143 of the bracket 9.

As shown in FIG. 4, the power cord 113 is attached to the holder 8. The power cord 113 includes the cord 115, an AC adaptor 196 coupled to one end of the cord 115, and a connector coupled to the other end of the cord 115. By being inserted into a power outlet, the AC adaptor 196 converts alternating-current power into direct-current power. The connector is inserted into the socket 129. When the AC adaptor 196 has been inserted into the power outlet and the connector has been inserted into the socket 129, electric power is supplied to the pair of electrodes 114 of the holder 8.

When the holder 8 is to be attached to the bracket 9, the holder 8 is inclined toward a front side, and the pair of L-shaped anchors 125 of the bracket 9 is inserted into the pair of holes 124 of the holder 8. Then the holder is slid a little toward the front, and the holes 124 and the L-shaped anchors 125 engage. That is, the horizontal portions 202 of the L-shaped anchors 125 enter toward an inner side of the plates 197 of the holes 124. The holder 8 is thus prevented from moving in the up-down direction and the left-right direction. However, the holder 8 can be rotated around the engaging portion (i.e. a lower front side portion) toward and away from the mounting surface 141. When the user rotates the holder 8 toward the mounting surface 141, the rear surface 127 of the holder 8 makes contact with a tip of the protruding portion 144 of the resilient plate 143. Thereupon, the resilient plate 143 is pushed toward the rear by the holder 8. That is, the resilient plate 143 is moved into a retracted position. When the user rotates the holder 8 further toward the mounting surface 141, the bottom surface 118 of the holder 8 and the mounting surface 141 make contact. Thereupon, the resilient plate 143 returns to its original position (an engaging position), and the protruding portion 144 of the resilient plate 143 is inserted into the concave portion 145 of the holder 8. That is, the resilient plate 143 and the rear surface 127 of the holder 8 are engaged. The holder 8 is thus prevented from rotating and from moving toward the rear. That is, the holder 8 is fixed to the bracket 9. The holder 8 can thus be reliably fixed to the bracket 9 by the engagement of the L-shaped anchors 125 and the resilient plate 143.

Furthermore, when the bottom surface 118 of the holder 8 and the mounting surface 141 make contact, the pair of holes 123 of the holder 8 and the pair of pins 126 of the bracket 9 engage. This also prevents the holder 8 from moving in the front-rear and left-right directions. Consequently the holder 8 is fixed more reliably to the bracket 9.

Furthermore, when the bottom surface 118 of the holder 8 and the mounting surface 141 make contact, the rear surface 127 of the holder 8 and the ribs 171 and 172 of the bracket 9 also make contact. This also prevents the holder 8 from moving in the front-rear direction. Consequently the holder 8 is fixed more reliably to the bracket 9.

When the holder 8 is rotated toward the mounting surface 141, the power cord 115 of the holder 8 is led through the groove 153 of the bracket 9 to the rear side. Then, as shown in FIG. 1, a portion of the led power cord 115 is fixed to the cord holding portion 131. The power cord 115 is thus disposed so as to extend from the holder 8 toward the rear. That is, the power cord 115 is prevented from extending around the main unit 11. Furthermore, it is possible to prevent a large amount of force being exerted on the connecting portions of the power cord 115 and the holder 8.

When the holder 8 is to be removed from the bracket 9, the user pulls the handle 147 toward the rear. Thereupon the resilient plate 143 moves toward the rear (i.e. to the retracted position). As a result, the resilient plate 143 and the holder 8 disengage. Next, the holder 8 is rotated away from the mounting surface 141, and the holder 8 is moved further toward the rear, whereupon the holes 124 and the L-shaped anchors 125 disengage. That is, the holder 8 is removed from the bracket 9. Since the resilient plate 143 can thus be made to deform from the engaging position to the retracted position by operating the handle 147, the user can easily remove the holder 8 from the bracket 9.

(Wireless Telephone 12)

Figure 3:
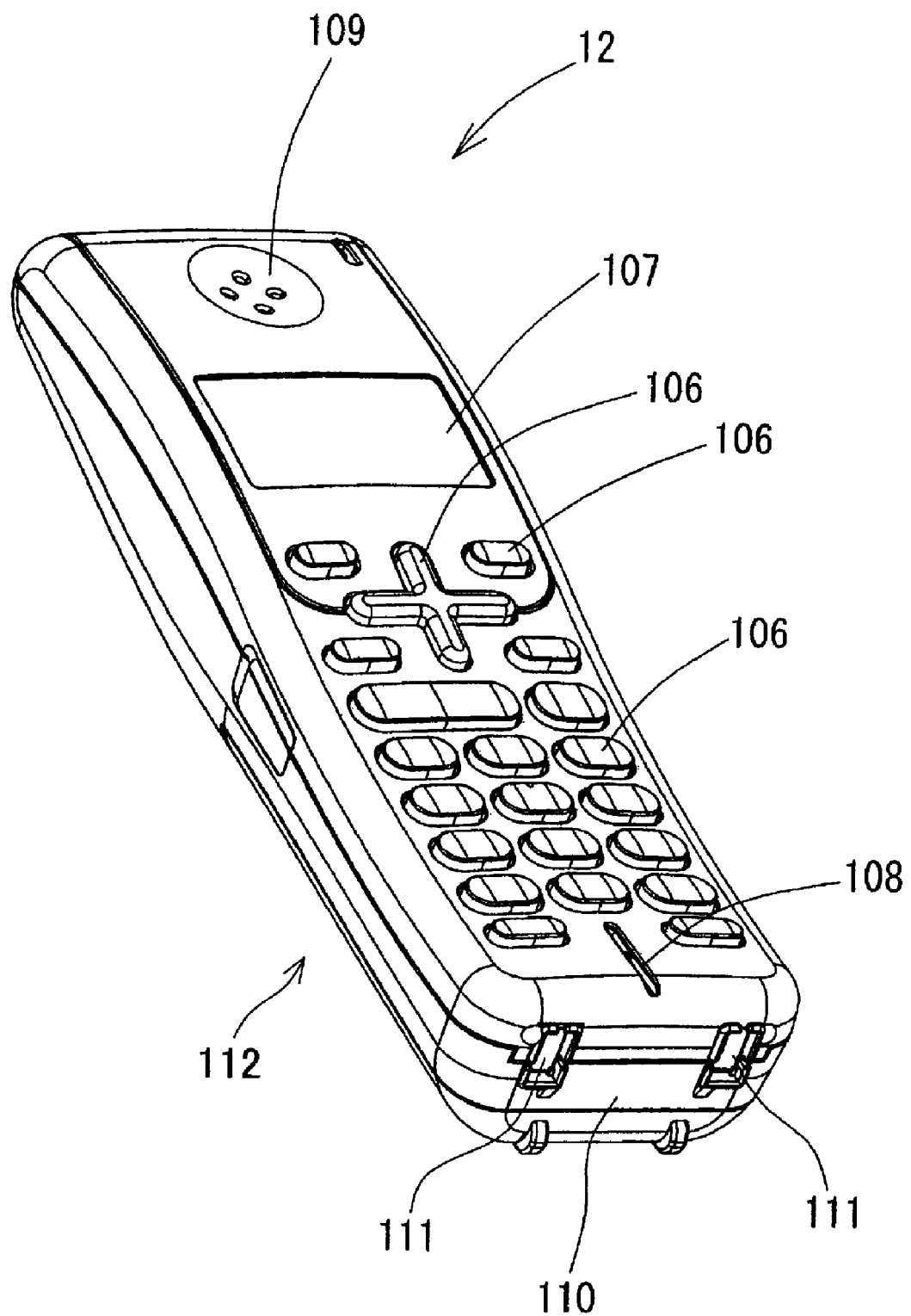
FIG. 3 shows a perspective view of a wireless telephone.

FIG. 3 shows an enlarged view of the wireless telephone 12. As shown in the figure, the wireless telephone 12 has a narrow rectangular shape. The following are disposed on an operation surface of the wireless telephone 12: operation buttons 106, a liquid crystal display 107, a microphone 108, and a speaker 109. In addition, a pair of electrodes 111 is disposed at a bottom surface 110 of the wireless telephone 12. Furthermore, the interior of the wireless telephone 12 comprises a wireless communication device 155, a battery 166, and an antenna 165.

Figure 18:
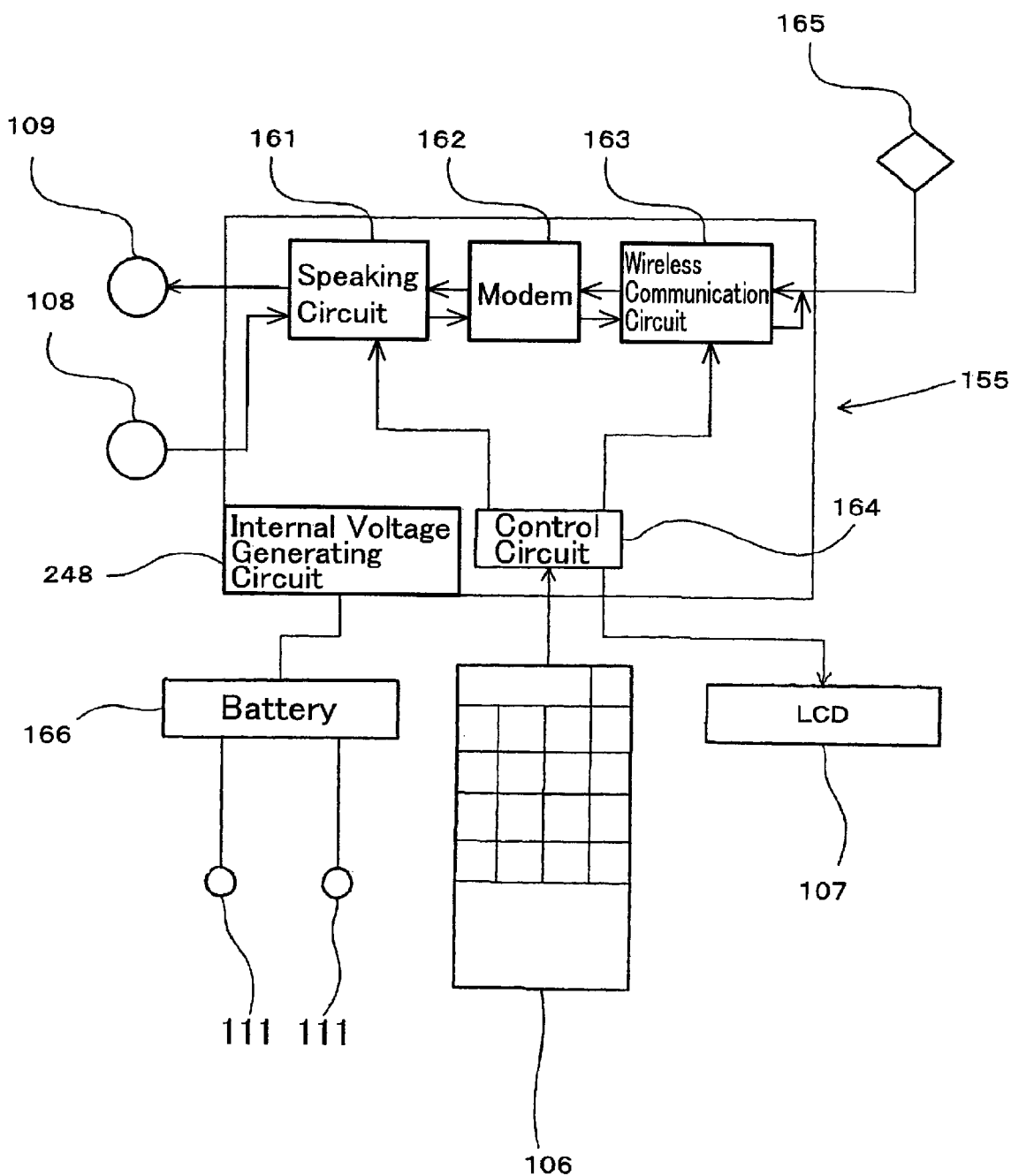
FIG. 18 shows a block diagram of the wireless telephone.

FIG. 18 is a block diagram schematically showing the configuration of the wireless telephone 12. As shown in the figure, the wireless communication device 155 is coupled with the operation buttons 106, the liquid crystal display 107, the microphone 108, the speaker 109, the antenna 165, and the battery 166. The wireless communication device 155 comprises a speaking circuit 161, a MODEM 162, a wireless communication circuit 163, a control circuit 164, and an internal voltage generating circuit 248.

The internal voltage generating circuit 248 is coupled to the battery 166. The internal voltage generating circuit 248 receives the electric power supplied from the battery 166. The internal voltage generating circuit 248 converts the supplied voltage into electric power of a predetermined voltage. The electric power generated by the internal voltage generating circuit 248 is supplied to the components of the wireless telephone 12.

As shown in the figure, the battery 166 is coupled to the pair of electrodes 111. Although this will be described in detail later, the pair of electrodes 114 of the holder 8 makes contact with the pair of electrodes 111 of the wireless telephone 12 when the wireless telephone 12 is placed in the holder 8. The battery 166 thus is supplied with electric power from the holder 8. That is, the battery 166 is charged. In addition, a lithium ion battery, etc. can be utilized as the battery 166.

Wireless communication between the wireless communication device 155 and the wireless communication device 158 of the main unit 11 can be established via the antenna 165 and the antenna 15 when a predetermined operation is performed by the operation buttons 106 of the wireless telephone 12. That is, a wireless link is formed between the wireless communication device 155 and the wireless communication device 158. When the wireless link is formed, the wireless communication device 158 of the main unit 11 communicates with the telephone communication network 156 via the NCU 87 and the MODEM 88. At this juncture, a dial tone is input into the wireless communication device 158 from the telephone communication network 156. The wireless communication device 158 transmits the dial tone to the wireless communication device 155 via the wireless link. Furthermore, when the wireless link is formed, the control circuit 164 of the wireless telephone 12 makes the wireless communication circuit 163 to communicate with the speaking circuit 161 via the MODEM 162. Therefore, the dial tone transmitted to the wireless communication device 155 is input into the speaking circuit 161. That is, the dial tone is output as audio from the speaker 109.

Next, when the user operates the operation buttons 106 (dial keys) in order to input a telephone number of another party, this number is displayed on the liquid crystal display 107. Furthermore, a signal that represents this number is transmitted from the wireless communication device 155 to the wireless communication device 158 via the wireless link. Thereupon, the main unit 11 dials a dial signal, corresponding to the telephone number, which is transmitted to the telephone communication network 156. The telephone call to the other party is thus performed. When a telephone device of the other party responds, telephone communication is performed between the wireless telephone 12 and the telephone device of the other party via the main unit 11. Telephone communication can be cut off by performing a predetermined operation using the operation buttons 106.

The wireless telephone 12 can be placed in the holder 8. A bottom portion 112 of the wireless telephone 12 is held in the holder 8 by inserting the bottom portion 112 of the wireless telephone 12 into the attachment hole 100 of the holder 8. As described above, the attachment hole 100 is formed so as to incline slightly toward the rear. As a result, the wireless telephone 12 is held in the holder 8 in an upright state that is slightly inclined toward the rear. Specifically, the bottom surface 110 of the wireless telephone 12 makes contact with the bottom surface 116 of the attachment hole 100, the rear surface of the wireless telephone 12 is supported by the rear inner surface 105 of the attachment hole 100, and both side surfaces of the wireless telephone 12 are supported by the ribs 117. The wireless telephone 12 is thus held stably in the holder 8.

When the wireless telephone 12 is held in the holder 8, the pair of electrodes 111 of the wireless telephone 12 and the pair of electrodes 114 of the holder 8 make contact. Electric power is thus supplied to the battery 166 of the wireless telephone 12, and the battery 166 is charged.

The wireless telephone 12 can be utilized by the user lifting the wireless telephone 12 upward from the holder 8. Since the wireless telephone 12 is held in an upright state, the user can easily lift the wireless telephone 12 out of the holder.

(Method of Using the Multi-Function Device 1)

The user can use the multi-function device 1 while the holder 8 is fixed to the main unit 11. That is, the bracket 9 is attached to the main unit 11, and the holder 8 is attached to the bracket 9. Then the wireless telephone 12 is placed in the holder 8 fixed to the main unit 11, and the wireless telephone 12 is charged. In this case, it is easy to simultaneously utilize the main unit 11 and the wireless telephone 12.

When the holder 8 and the bracket 9 are fixed to the multi-function device 1, highest portions of the holder 8 and the bracket 9 are located lower than a lowest end 30a of the side surfaces of a cover plate 30 that is in a closed state. As a result, the holder 8 and the bracket 9 do not impede the opening and closing of the cover plate 30 by making contact with the side surfaces of the cover plate 30. Furthermore, the clearance is formed between the wireless telephone 12 and the side surfaces of the cover plate 30 while the wireless telephone 12 is placed in a holder 8 that is fixed to the main unit 11. As a result, the wireless telephone 12, the holder 8, and the bracket 9 do not impede the opening and closing of the cover plate 30. Furthermore, the phenomenon, wherein the cover plate 30 is opened accidentally when the wireless telephone 12 is removed from the holder 8, is also prevented.

Furthermore, in the multi-function device 1, the wireless telephone 12 is lifted upward when the wireless telephone 12 is removed from a holder 8 that is fixed to the main unit 11. At this juncture, the wireless telephone 12 can be removed without lifting the wireless telephone higher than the level at which a top end of the cover plate 30 is located when the cover plate 30 is fully opened. That is, the multi-function device 1 must only be located such that the cover plate 30 can be fully opened in order to satisfactorily utilize the main unit 11. As a result, in the case where the multi-function device 1 is located on shelving having a plurality of tiers, or the like, it is necessary to place the main unit 11 in a location where the top end of the cover plate 30 does not make contact with the lower side of the tier above, when the cover plate 30 is fully opened. With this multi-function device 1, the wireless telephone 12 can be removed from the holder 8 without lifting the wireless telephone higher than the level at which the top end of the cover plate 30 is located when the cover plate 30 is fully opened. As a result, the wireless telephone 12 can be removed from the holder 8 without the wireless telephone 12 making contact with the lower side of the tier above even when the main unit 11 is located as described above.

Furthermore, the holder 8 can also be located in a position separate from the main unit. In this case, the holder 8 is removed from the bracket 9, and the holder 8 is located in a position separate from the main unit. If the power cord 115 is coupled to the power outlet, the battery 166 of the wireless telephone 12 can be charged by the holder 8. That is, the holder 8 and the wireless telephone 12 can be utilized even when the holder 8 is removed from the main unit 11. In addition, it is possible to reduce the space required for positioning the main unit 11 if the bracket 9 is removed from the main unit 11.

Moreover, the bottom surface of the holder 8 is formed in a shape capable of being placed stably on a flat surface. As a result, the holder 8 can be positioned in a stable state.

Furthermore, the holder 8 holds the wireless telephone 12 in an upright state. As a result, the bottom surface of the holder 8 can be made smaller than in a case where the holder holds the wireless telephone 12 in a reclined state. As a result, it is possible to further reduce the size of the base used for positioning the holder 8.

Furthermore, since all parts formed for the purpose of engaging with the bracket 9 are formed on the bottom surface 118 of the holder 8, the holder 8 has a neat appearance when placed on a flat surface.

Figure 19:
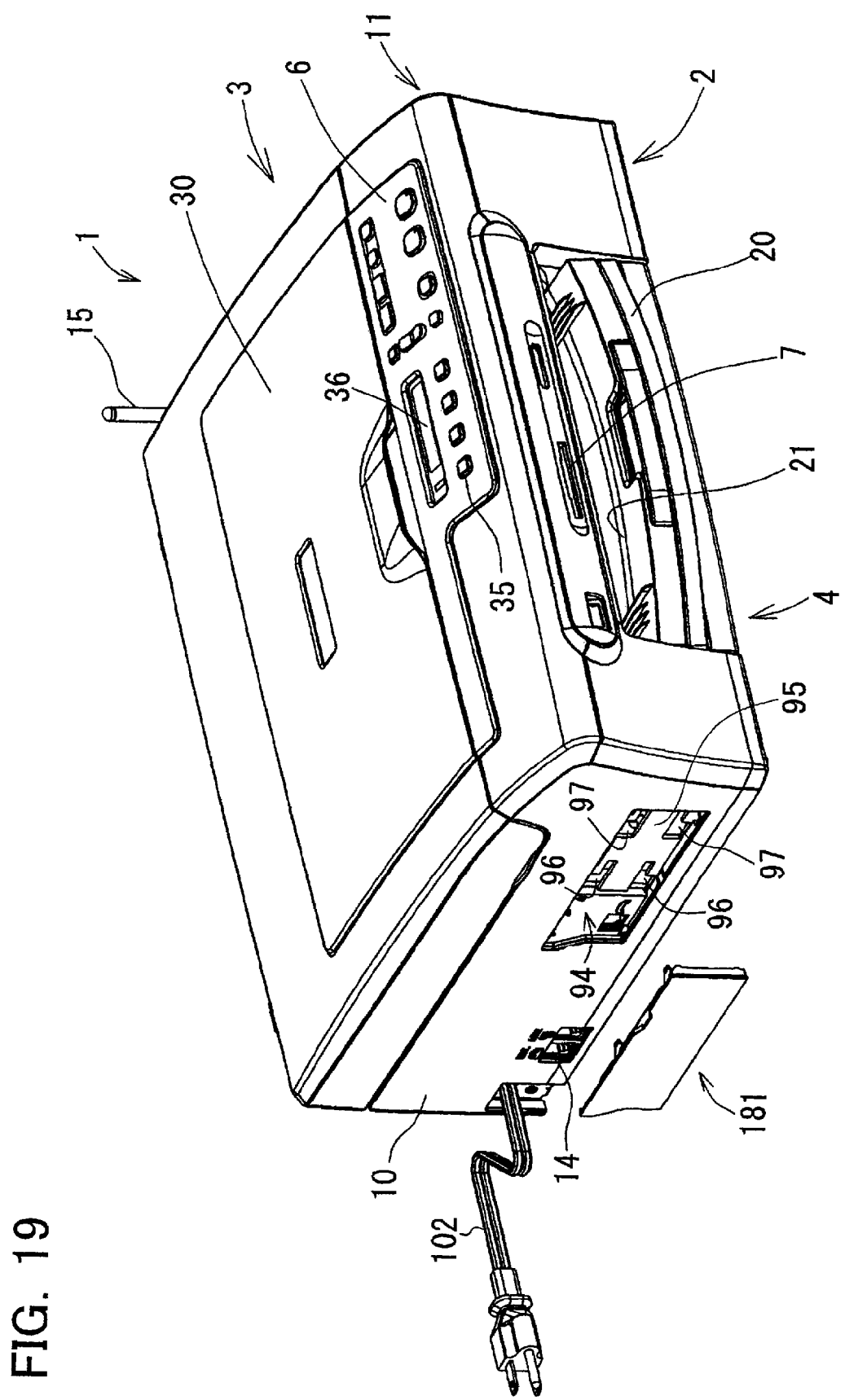
FIG. 19 shows an explanatory view of a panel.
Figure 20:
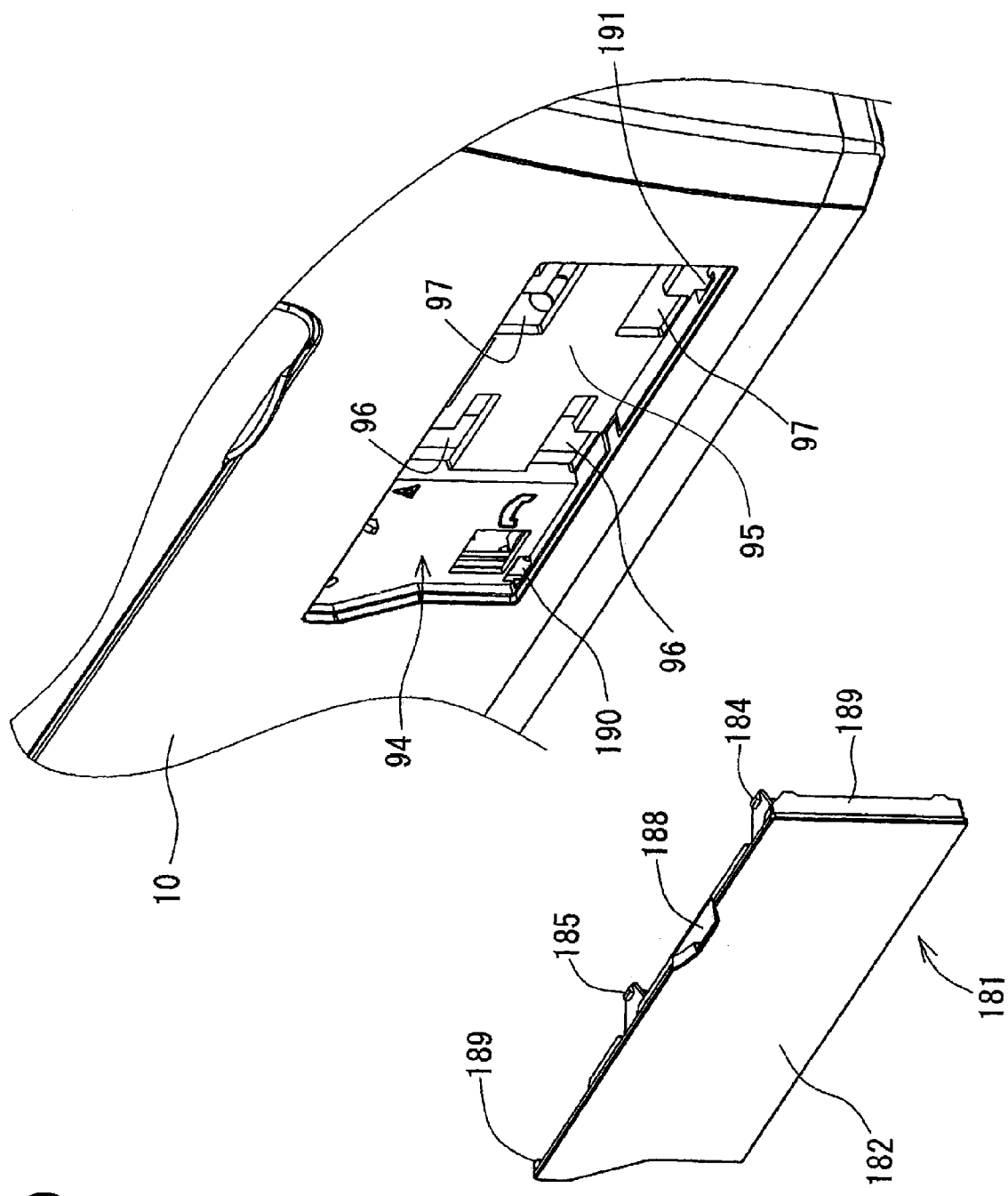
FIG. 20 shows an enlarged view of the panel.
Figure 21:
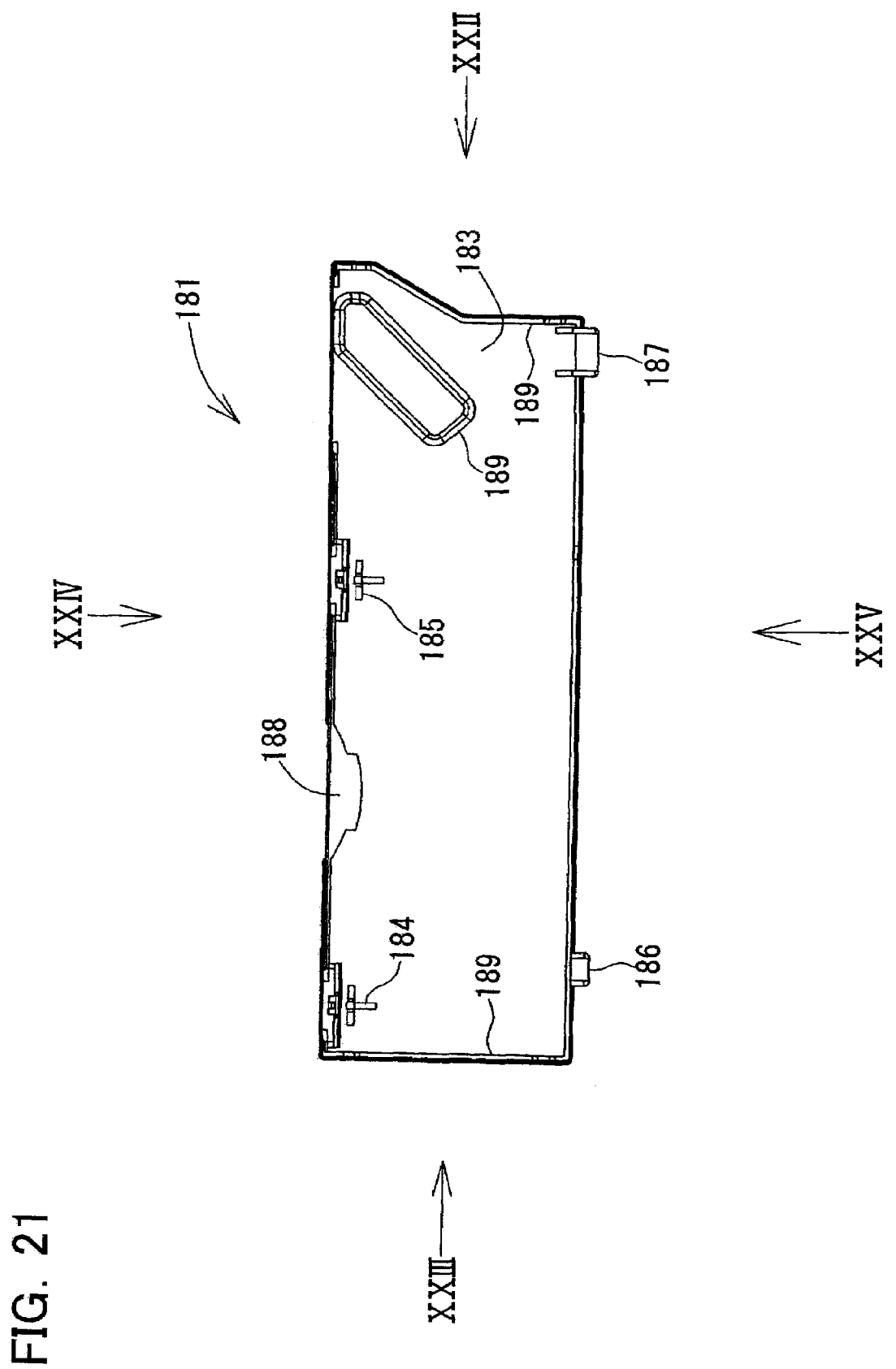
FIG. 21 shows an inner surface view of the panel.
Figure 22:
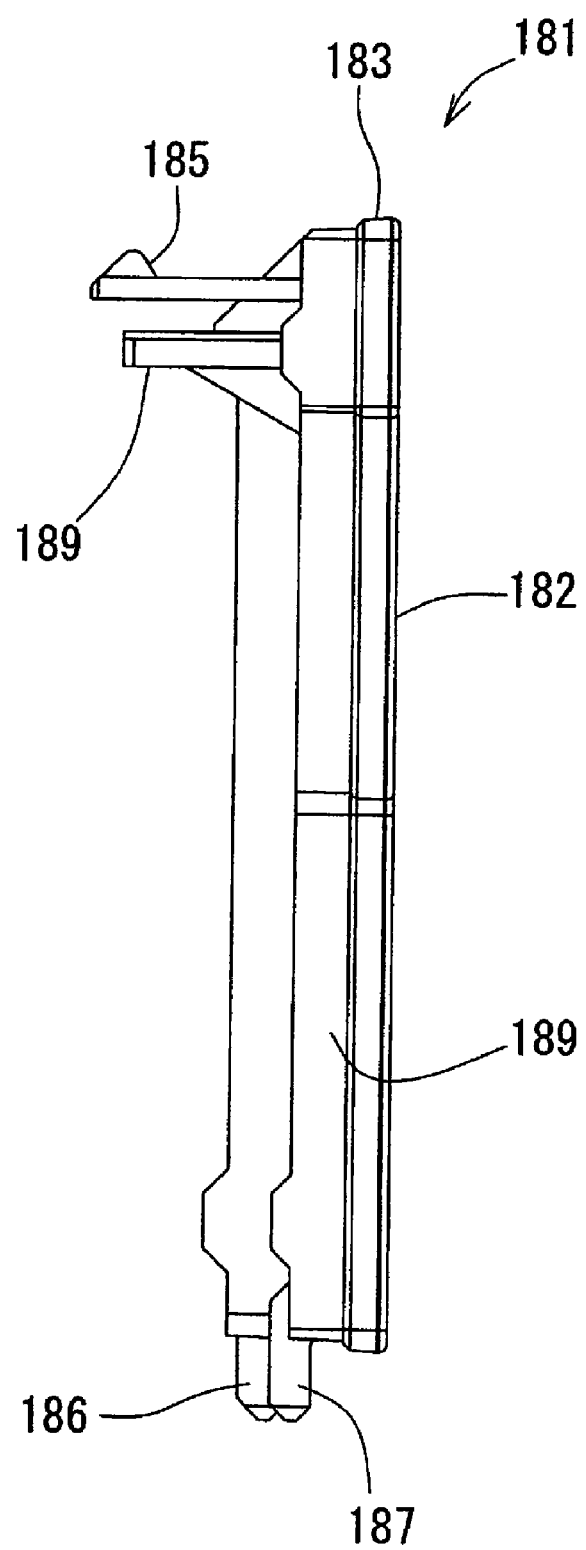
FIG. 22 shows the panel viewed from the side of the arrow XXII of FIG. 21.
Figure 23:
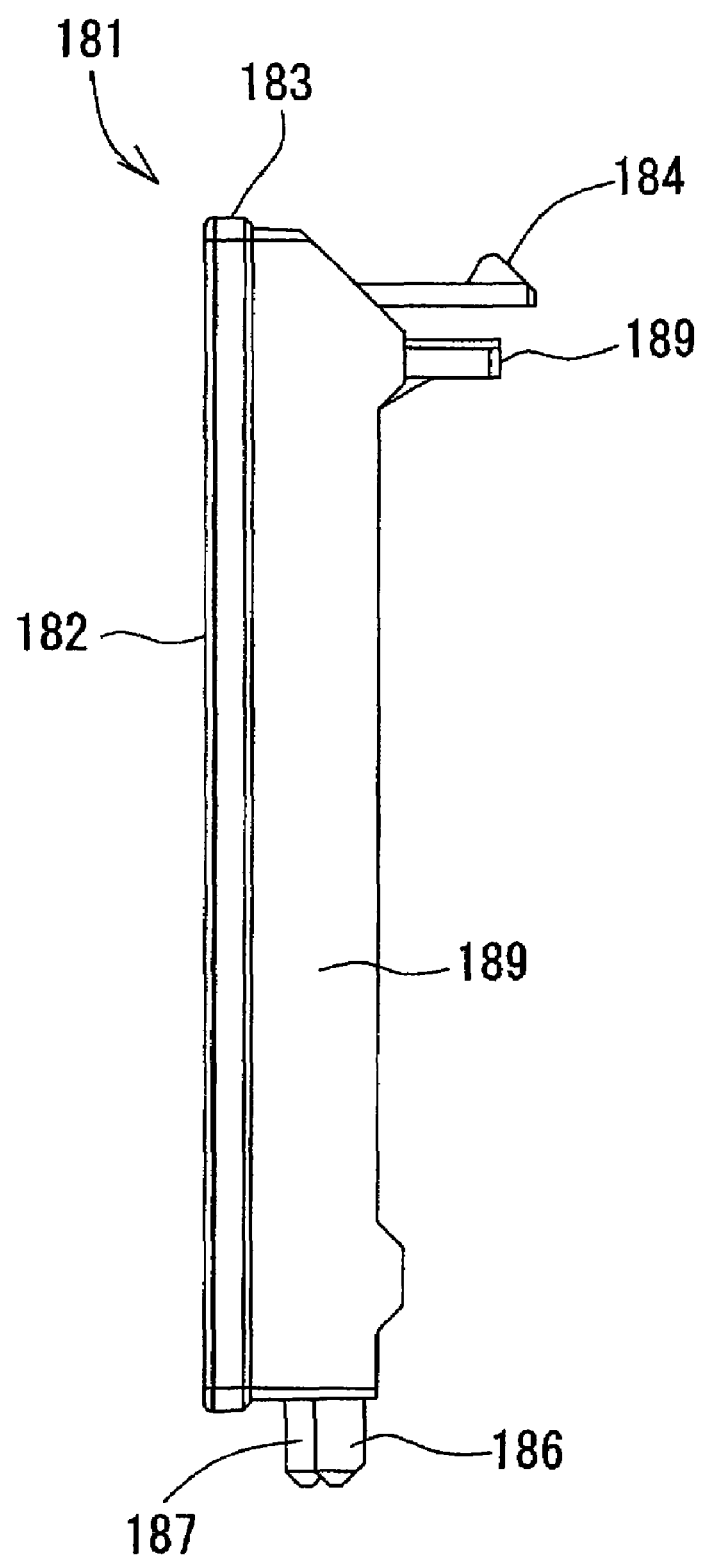
FIG. 23 shows the panel viewed from the side of the arrow XXIII of FIG. 21.
Figure 24:
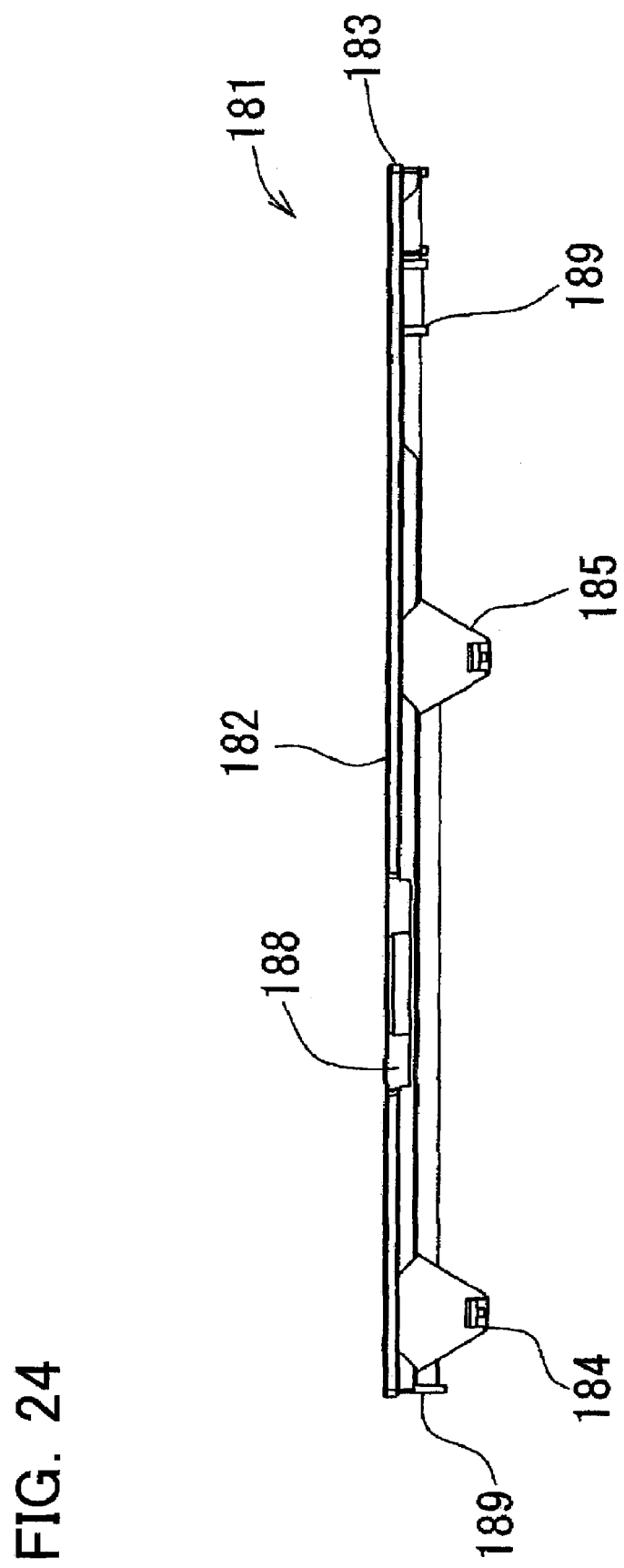
FIG. 24 shows the panel viewed from the side of the arrow XXIV of FIG. 21.
Figure 25:
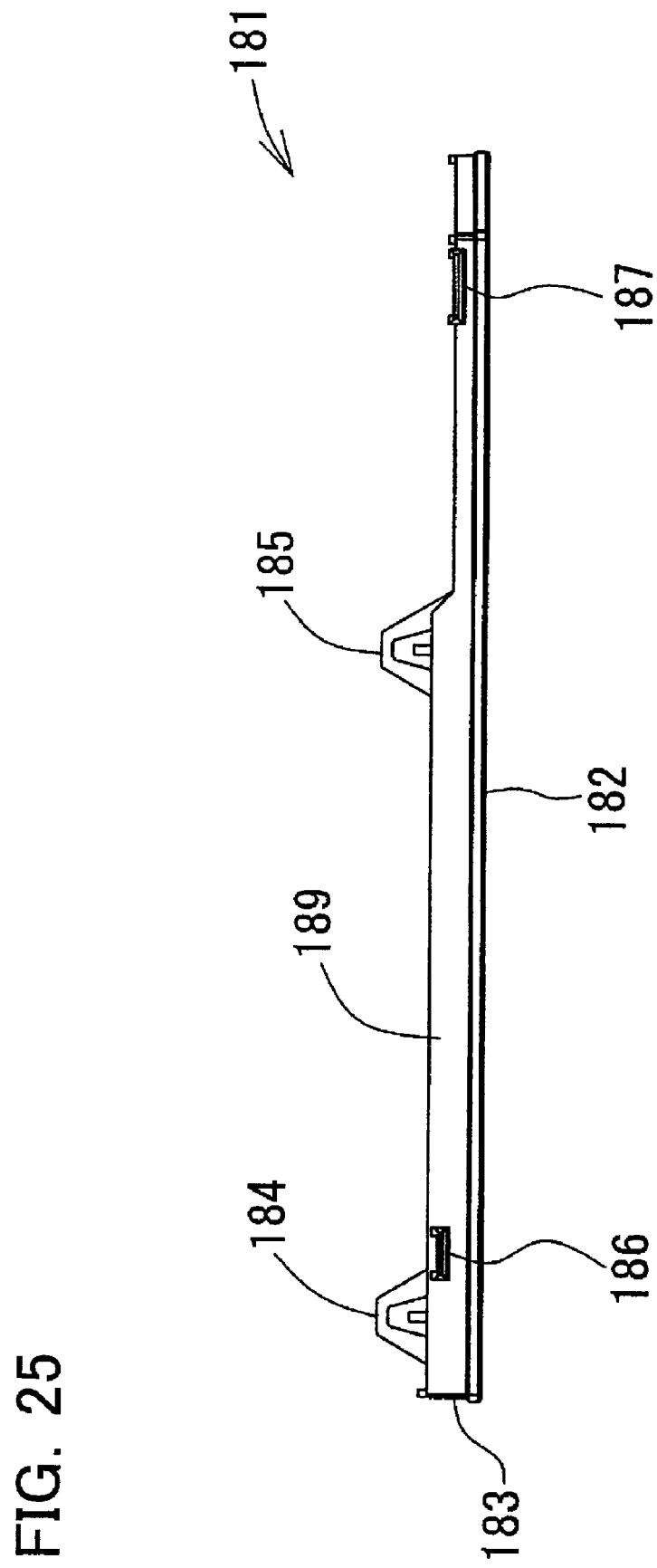
FIG. 25 shows the panel viewed from the side of the arrow XXV of FIG. 21

The frame 95 is exposed at the left side wall 10 of the main unit 11 when the bracket 9 is removed from the main unit 11. As a result, as shown in FIGS. 19 and 20, it is preferred that the multi-function device 1 is provided with a panel 181 that can be attached to the opening 94 in place of the bracket 9.

As shown in FIGS. 21 to 25, the panel 181 is a plate-like member that is substantially rectangular. A surface 182 of the panel 181 is flat. The panel 181 comprises a plate portion 183 that has the aforementioned surface 182, engaging portions 184, 185, 186, and 187 that protrude from an inner surface of the plate portion 183, and a rib 189. The engaging portions 184 and 185 protrude substantially perpendicularly with respect to the inner surface. The engaging portions 186 and 187 are formed so as to protrude outward from the panel 181. The rib 189 is formed so as to ensure the strength of the panel 181. A notch 188 is formed in a top portion of the inner surface of the plate portion 183.

When the panel 181 is attached to the main unit 11, the engaging portions 186 and 187 of the panel 181 are inserted into engaging holes 190 and 191 formed in the opening 94 (see FIG. 20) of the main unit 11. Thereupon the panel 181 is moved toward the main unit 11, and is fitted into the opening 94 so that the panel 181 covers the opening 94. Then the engaging portions 184 and 185 engage with a top portion of the opening 94. The panel 181 is thus fixed to the main unit 11. When the panel 181 is to be removed from the main unit 11, a finger is applied to the notch 188 and the panel 181 is pulled. The panel 181 can thus be easily removed from the main unit 11.

As described above, the panel 181 can be attached to the opening 94 of the main unit 11 in place of the bracket 9. Therefore, even when the bracket 9 is removed from the main unit 11, the main unit 11 maintains a neat appearance by attaching the panel 181 to the opening 94.

A specific example of an embodiment of the present invention is presented above, but this merely illustrates some possibilities of the invention and does not restrict the claims thereof. The art set forth in the claims encompasses various transformations and modifications to the embodiment described above.

Furthermore, the technical elements explained in the present specification and drawings provide technical value and utility either independently or through various combinations. The present invention is not limited to the combinations described at the time the claims are filed. Furthermore, the purpose of the example illustrated by the present specification and drawings is to satisfy multiple objectives simultaneously, and satisfying any one of those objectives gives technical value and utility to the present invention.

What is claimed is:

1. A multi-function device for performing, at least, telephone communication and facsimile functions, comprising:
  a main unit including an interface device configured to communicate with a telephone communication network, a facsimile device configured to communicate with the interface device, and a wireless communication device configured to communicate with the interface device and configured to communicate with at least one external device wirelessly;
  a wireless telephone configured to communicate wirelessly with the wireless communication device, the wireless telephone including a battery; and
  a charger configured to charge the battery while the wireless telephone is mounted on the charger, wherein the charger is configured selectively to be fixed to the main unit and to be separated from the main unit, and the charger is configured to charge the battery in both of a first state in which the charger is fixed to the main unit and a second state in which the charger is separated from the main unit, wherein the charger comprises:
  a bracket member removably fixed to a side wall of the main unit,
  a holding member removably fixed to the bracket member, the holding member including a portion configured to receive the wireless telephone, and
  a fastener configured to move between an engaging position and a retracted position, wherein the holding member is fixed to the bracket member when the fastener is at the engaging position and is removed from the bracket member when the fastener is at the retracted position.

2. The multi-function device of claim 1, further comprising:
  a cover plate configured to expose and cover a top surface of the main unit by opening and closing, the cover plate including a side portion that forms an upper portion of a side wall of the main unit while the cover plate is covering the top surface of the main unit,
  wherein the charger is fixed to a lower portion of the side wall of the main unit such that a highest end of the charger is lower than a lowest end of the side portion of the cover plate while the cover plate is covering the top surface of the main unit, and
  a clearance is formed between the side portion of the cover plate and the wireless telephone mounted on the charger fixed to the main unit.

3. The multi-function device of claim 2, wherein the wireless telephone can be removed from and returned to the charger fixed to the main unit without lifting the wireless telephone higher than a level at which a top end of the cover plate is located when the cover plate is fully opened.

4. The multi-function device of claim 1, wherein when the charger is fixed to the main unit, a bottom surface of the charger is kept higher than a bottom surface of the main unit.

5. The multi-function device of claim 1, wherein the holding member includes a bottom surface whose shape allows the holding member to be stably placed on a flat surface.

6. The multi-function device of claim 5, wherein the holding member holds the wireless telephone in an upright position.

7. A multi-function device for performing, at least, telephone communication and facsimile functions, comprising:
  a main unit including an interface device configured to communicate with a telephone communication network, a facsimile device configured to communicate with the interface device, and a wireless communication device configured to communicate with the interface device and configured to communicate with at least one external device wirelessly;
  a wireless telephone configured to communicate wirelessly with the wireless communication device, the wireless telephone including a battery; and
  a charger configured to charge the battery while the wireless telephone is mounted on the charger, wherein the charger is configured selectively to be fixed to the main unit and to be separated from the main unit, and the charger is configured to charge the battery in both of a first state in which the charger is fixed to the main unit and a second state in which the charger is separated from the main unit wherein the charger comprises:

a bracket member removably fixed to a side wall of the main unit, and a holding member removably fixed to the bracket member, the holding member including a portion configured to receive the wireless telephone, and a bottom surface whose shape allows the holding member to be stably placed on a flat surface; and wherein the bracket member comprises:

a mounting portion configured to receive the holding member;

a first supporting portion configured to engage with a lower front side portion of the holding member and supporting the holding member such that the holding member is rotatable around the lower front side portion toward and away from the mounting portion;

a second supporting portion configured to engage with the holding member, the second supporting portion being capable of changing between an engaging position and a retracted position, and a handle configured to change the position of the second supporting portion from the engaging position to the retracted position when an external force is applied to the handle, wherein:

the second supporting portion is at the engaging position when the second supporting portion is not in contact with the holding member, the second supporting portion is changed to the retracted position while the holding member is rotated towards the mounting portion of the bracket member around the lower front side portion of the holding member and at least a part of the second supporting portion makes contact with the holding member, and the second supporting portion is changed to the engaging position to engage with the holding member and prevent the holding member from rotating around the lower front side portion of the holding member when the holding member is further rotated and the bottom surface of the holding member makes contact with the mounting portion of the bracket member.

8. The multi-function device of claim 7, wherein the holding member comprises a hole formed at a front side of the bottom surface, the first supporting portion comprises an anchor formed at a front end of the mounting portion, wherein a vertical sectional shape of the anchor is L-shaped, and when the anchor is inserted into the hole, the holding member is supported by the bracket member such that the holding member can rotate around the lower front side portion of the holding member.

9. The multi-function device of claim 7, wherein the bracket member further comprises a contact portion configured to make contact with a rear surface of the holding member and preventing the holding member from moving backward when the bottom surface of the holding member is making contact with the mounting portion of the bracket member.

10. The multi-function device of claim 7, wherein the mounting portion of the bracket member comprises an engaging portion configured to engage with the bottom surface of the holding member and preventing the holding member from moving backward when the bottom surface of the holding member is making contact with the mounting portion of the bracket member.

11. The multi-function device of claim 7, wherein the bottom surface of the holding member comprises a first shape, the mounting portion of the bracket member comprises a second shape, and the first and the second shapes are engaged when the bottom surface of the holding member is making contact with the mounting portion of the bracket member.

12. The multi-function device of claim 7, wherein the bottom surface of the holding member comprises a concave shape, the mounting portion of the bracket member comprises a convex shape, and the concave and the convex shapes are engaged when the bottom surface of the holding member is making contact with the mounting portion of the bracket member.

13. The multi-function device of claim 7, wherein the second supporting portion changes position through elastic deformation.

14. The multi-function device of claim 7, wherein the second supporting portion is formed on a rear end of the mounting portion of the bracket member and engages with a rear surface of the holding member.

15. The multi-function device of claim 7, wherein the handle extends from the second supporting portion in an upward direction.

16. The multi-function device of claim 7, wherein the holding member comprises a power cord, and the bracket member comprises a holding part which holds the power cord such that the power cord extends along a predetermined direction.

17. The multi-function device of claim 7, further comprising:

a cover configured to be fixed to the main unit instead of the bracket member.

* * * * *